US012743062B2

(12) United States Patent
Zhao et al.

(10) Patent No.: US 12,743,062 B2
(45) Date of Patent: Sep. 22, 2026

(54) SYSTEM AND METHOD FOR BUILDING AND DEPLOYING PRESCRIPTIVE ANALYTICS TO PREDICT AND CONTROL END PRODUCT QUALITY IN BATCH PRODUCTION MONITORING AND OPTIMIZATION

(71) Applicant: AspenTech Corporation, Bedford, MA (US)

(72) Inventors: Hong Zhao, Sugar Land, TX (US); Ashok Rao, Sugar Land, TX (US); Mir Khan, Katy, TX (US)

(73) Assignee: AspenTech Corporation, Bedford, MA (US)

( * ) Notice: Subject to any disclaimer, the term of this patent is extended or adjusted under 35 U.S.C. 154(b) by 1032 days.

(21) Appl. No.: 17/809,640

(22) Filed: Jun. 29, 2022

(65) Prior Publication Data

US 2024/0004355 A1 Jan. 4, 2024

(51) Int. Cl.

*G05B 13/04* (2006.01)
*G05B 13/02* (2006.01)
*G05B 23/02* (2006.01)

(52) U.S. Cl.

CPC ....... *G05B 13/048* (2013.01); *G05B 13/0265* (2013.01); *G05B 23/0221* (2013.01)

(58) Field of Classification Search

CPC .......... G06N 20/10; G05B 2219/32077; G05B 23/0275; G05B 23/024

See application file for complete search history.

(56) References Cited

U.S. PATENT DOCUMENTS

2011/0288837 A1 11/2011 Blevins et al.
2013/0069792 A1 3/2013 Blevins et al.
(Continued)

FOREIGN PATENT DOCUMENTS

WO WO-2017124074 A1 * 7/2017 ............. G06T 7/001
WO 2024/006795 A1 1/2024

OTHER PUBLICATIONS

International Search Report and Written Opinion received for PCT Patent Application No. PCT/US2023/069219, mailed on Oct. 24, 2023, 15 pages.

(Continued)

*Primary Examiner* — Mohammad Ali
*Assistant Examiner* — Dhruvkumar Patel
(74) *Attorney, Agent, or Firm* — Hamilton, Brook, Smith & Reynolds, P.C.

(57) ABSTRACT

Embodiments control and optimize batch processes. An embodiment obtains and standardizes historical operating data from a plurality of batch production runs of an industrial process. For each batch production run, the standardized operating data corresponding to the batch is partitioned into one or more stages and one or more signature for each stage is determined using the partitioned standardized data. Each determined signature is associated with a class label based upon whether output of a batch run corresponding to the signature conforms or does not conform with operational standards. A model is trained, with at least a subset of the signatures as inputs and associated class labels as outputs, to predict, based on operating data from a real-world batch process, whether output of the process will conform or not conform with the operational standards. Online predictions can be automatically or manually applied to control and optimize a batch production run.

17 Claims, 13 Drawing Sheets
(1 of 13 Drawing Sheet(s) Filed in Color)

(56) References Cited

U.S. PATENT DOCUMENTS

| | | | |
|---|---|---|---|
| 2018/0300865 A1* | 10/2018 | Weiss ............... | G05B 19/41875 |
| 2019/0332101 A1 | 10/2019 | Castillo Castillo et al. | |
| 2020/0265331 A1* | 8/2020 | Tashman ................ | G06N 20/20 |
| 2022/0035348 A1 | 2/2022 | Ma et al. | |
| 2023/0237412 A1* | 7/2023 | Cheon ................ | G06Q 10/0639 705/7.38 |
| 2024/0160194 A1* | 5/2024 | Bakhshmand ....... | G06N 3/0455 |

OTHER PUBLICATIONS

Nomikos, Paul, and John F. MacGregor. "Monitoring batch processes using multiway principal component analysis." AlChE Journal 40.8 (1994): 1361-1375.
Fenjiro, "Face Id: Deep learning for face recognition," available at https://medium.com/@fenjiro/face-id-deep-learning-for-face-recognition-324b50d916d1, Jul. 16, 2019.

* cited by examiner

SYSTEM AND METHOD FOR BUILDING AND DEPLOYING PRESCRIPTIVE ANALYTICS TO PREDICT AND CONTROL END PRODUCT QUALITY IN BATCH PRODUCTION MONITORING AND OPTIMIZATION

BACKGROUND

A batch process is a process with defined start and end conditions and some evolution of behavior (captured by measured variables) in between. Typical batch process examples are often seen in the manufacturing industry of special chemicals, pharmaceuticals, blending and mixing, polymer processing, semiconductor manufacturing, and processing of food products, and amongst other examples. In contrast to mass production, batch production processing offers manufacturers many advantages. Example advantages of batch production processing include flexibility of producing high-margin products in smaller quantities, flexible utilization of facility capabilities (e.g., using facility capabilities to produce different products at different points in time), easier quality-control, and reduced waste.

Because batch production processes play an important role in many industries, developing and deploying advanced modeling, monitoring, and control systems in batch production processes is desirable and beneficial to many manufacturers. The uses of advanced modeling, monitoring, and control in batch production processes is particularly advantageous for processes in the special chemicals, pharmaceutical, food, polymer, and semiconductor industries.

SUMMARY

Batch production processes have many special characteristics that make it difficult to simply apply many of the existing approaches that are used for continuous process monitoring, control, and optimization. Instead, a set of special modeling and control technologies for batch processes are typically utilized. For example, batch-specific Principal Component Analysis (PCA) and Projection to Latent Structure (PLS) multivariate statistical models are used to monitor and control batch processes (see Paul Nomikos, John F. MacGregor, "Monitoring Batch Processes Using Multiway Principal Component Analysis, AIChE Journal," 40(8), 1361-1375 (August 1994)). Likewise, batch-specific industrial software tools, such as Aspen ProMV®, are used for Multivariate Statistical Process Control (MSPC) for batch processes.

A problem that makes batch production processes particularly unsuitable for modeling, monitoring, and control using existing methods is the inability to know the product quality of a running batch until the batch process is complete. In today's industrial practices, the rate of "failed" batches is high and some batch production processes, (e.g., in food processing and special chemical productions) produce products that are "out of specification" 30-50% of the time. This is extremely costly for producers. As such, improvements to batch production modeling, monitoring, and control are needed.

Embodiments provide such functionality and provide solutions to the above mentioned shortcomings of existing methods. For instance, embodiments address the following problems that are challenging to manufacturers in batch process production: (1) there is no model/method available that is able to quantitatively predict end-batch product quality, or predict throughout production whether a running batch is going to be "in-spec" or "out-of-spec" and (2) current MSPC based models typically detect anomalies and issue alerts only in batch monitoring, and are unable to provide actionable advice.

Example embodiments implement a unique supervised machine learning approach, specifically using pattern-recognition techniques to provide an innovative solution to the problems in batch monitoring and optimization.

One such example embodiment is directed to a computer-implemented method for creating a machine learning predictive model for real-world batch production industrial process monitoring and optimization. The method obtains historical operating data from a plurality of batch production runs of an industrial process and standardizes the obtained historical operating data for each run of the plurality of batch production runs. In turn, for each batch production run of the plurality, the method (i) partitions standardized operating data corresponding to the batch production run into one or more stages and (ii) determines one or more signature(s) for each of the one or more stages using the partitioned standardized operating data corresponding to the one or more stages. Each determined signature is associated with a class label based upon output of a batch production run of the plurality corresponding to the determined signature conforming with operational standards or not conforming with the operational standards. The method trains a machine learning predictive pattern model with at least a subset of the determined operational signatures as inputs and associated class labels as outputs. The training configures the model to predict, based on operating data from a real-world batch production process, whether output of the real-world batch production process will conform or not conform with the operational standards. The method is computer implemented and, as such, the functionality, the obtaining, standardizing, partitioning, determining, associating, and training, are automatically implemented by one or more processors.

In an embodiment, the obtained historical operating data is collected from one or more sensor measurements. According to another embodiment, for each batch production run of the plurality, the obtained historical operating data is configured to include: (i) batch initialization data, (ii) batch progress data, and (iii) batch end product quality data.

Embodiments of the method may perform a variety of different operations to standardize the obtained historical operating data for each run of the plurality. In an embodiment, the standardizing aligns the obtained historical operating data for each batch production run of the plurality with a specified standard reference batch over time. Another embodiment detects and removes outlier runs from the obtained historical operating data as part of the standardizing. According to another embodiment, the standardizing includes labeling each batch production run of the plurality with a class label. Said class labels indicate whether output of the batch production run conforms with operational standards, e.g., product specifications (chemical concentration greater than 20 mg/l), or does not conform with the operational standards.

According to an embodiment, determining one or more signature for each of the one or more stages using the partitioned standardized operating data comprises generating one or more engineering features (EFs) or Key Performance Indicators (KPIs), using the partitioned standardized operating data corresponding to the one or more stages. The generated EFs and/or KPIs are grouped into a set to form a given signature. In an embodiment, a set forming a signature is an expandable set. In such an embodiment, grouping the generated one or more EFs or KPIs into the expandable set to form the given signature includes (i) adding the one or more EFs or KPIs into the expandable set over time as the one or more EFs or KPIs are generated and (ii) assigning a weight to each of the generated one or more EFs or KPIs in the expandable set. According to one such embodiment, the expandable set increases in size over time with progress of a given batch production run.

Another embodiment further includes receiving input indicating a selected signature type. In such an embodiment, the selected signature type is determined. According to an embodiment, each signature is determined at pre-defined points of each stage. In an embodiment, stages are key points in time within a batch process. Example stages include start of a batch run, first phase completion, and completion of half of the batch run, amongst other examples. The stages can be defined as a snapshot status of a batch run, or completion of a sub-processes (e.g., phases) in a batch run. Moreover, the stages can be time (batch progress time) relevant.

An embodiment of the method trains the machine learning pattern model by first splitting the determined signatures (model inputs) with their associated class labels (model outputs) into training and testing sub-datasets. The training sub-dataset is the subset of the determined signatures with their associated class labels. In turn, the machine learning predictive pattern model is trained with a K-Nearest Neighbor (KNN) and Support Vector Machine (SVM) supervised-learning methodology by feeding determined signatures from the training sub-dataset into the at least one machine learning predictive pattern model as inputs and associated class labels as outputs. According to an embodiment, the training also includes validating the trained machine learning predictive pattern model with the testing sub-dataset and fine-tuning KNN and SVM model parameters.

In an embodiment, the operational standard is at least one of: a physical criterion and a chemical criterion. For instance, the operational standard may be a certain quality or purity level for an end product of the batch process.

Embodiments also deploy the trained predictive model in a live batch production process to control the process. One such embodiment automatically receives sensor data from an ongoing batch production run of the industrial process (the live process). The received sensor data is processed with the trained machine learning predictive pattern model to determine a prediction of output of the ongoing batch production run as conforming or non-conforming with the operational standards. In an example embodiment, the determined prediction includes an indication of statistical probability of the determined prediction. In other words, such an embodiment provides an indication of confidence in the determined prediction of whether output of the ongoing batch production run will conform or not conform with the operational standards at the end point of the run.

An embodiment issues an alert to a user if both (i) the determined prediction indicates the output is non-conforming and (ii) the indication of statistical probability in the determined prediction is above a threshold. Yet another embodiment, at a current batch progress stage of the ongoing batch production run, examines the indication of statistical probability in the determined prediction and performs an online root-cause analysis. Such an embodiment may be configured to perform the root cause analysis if: (i) the determined prediction indicates the output is non-conforming and (ii) the indication of statistical probability in the determined prediction is above a threshold. In yet another embodiment, if the determined prediction indicates the output is non-conforming and (ii) the indication of statistical probability in the determined prediction is above a threshold, the method determines, from among the historical operating data, at least one K-nearest neighbor batch to the ongoing batch production run. Then, based on the determined at least one K-nearest neighbor batch, a comparative analysis between the at least one K-nearest neighbor batch and a standard reference batch is performed by using at least one multivariate statistical model, such as PCA or PLS models.

Another example embodiment deploys the trained machine learning predictive pattern model online in the industrial process at one or more pre-specified time points of a batch run. Such an embodiment uses the deployed trained machine learning predictive pattern model to predict whether output of the batch run of the industrial process will conform or not conform with the operational standards. In such an embodiment, real-time batch monitoring and analysis is executed based on the prediction of whether the batch will conform or not conform. This analysis includes at least one of (i) diagnosing one or more operational problems in the batch run of the industrial process and (ii) providing prescriptive guidance to a plant operator with one or more recommended corrective actions. In an embodiment, diagnosing one or more problems and providing prescriptive guidance to a plant operator includes identifying one or more contributing KPIs and outputting an alert to the plant operator with an associated risk assessment report and root-cause analysis report.

Another embodiment is directed to a computer system for creating a machine learning predictive pattern model for real-world batch production industrial process monitoring and optimization. The computer system includes a processor and a memory with computer code instructions stored thereon. In such an embodiment, the processor and the memory, with the computer code instructions, are configured to cause the system to implement any embodiments or combination of embodiments described herein.

Yet another embodiment is directed to a computer program product for creating a machine learning predictive pattern model for real-world batch production industrial process monitoring and optimization. The computer program product comprises one or more non-transitory computer-readable storage devices and program instructions stored on at least one of the one or more storage devices. The program instructions, when loaded and executed by a processor, cause an apparatus associated with the processor to create a machine learning predictive pattern model for real-world batch production industrial process monitoring and optimization as described herein.

Embodiments build predictive analytic models from historical batch data and deploy the analytic models online to predict end batch product quality. Using the predictions, embodiments monitor and optimize batch production through diagnostic analysis and prescriptive guidance.

An embodiment generates a dataset by loading historical batch production data of a subject batch production process. In an embodiment, the dataset contains a batch initialization data block (Z-block), including multiple feed ingredient compositions, physical and chemical properties, and initial operation conditions of the batch at a starting point. The dataset, according to an embodiment, also includes a batch progress data block (X-block), containing multiple sensor (variables) measurements collected over progress of the batch. According to an embodiment, each variable includes an engineering tag and measurements related to at least one property of the subject batch process. Further still, the dataset can include a batch-end product quality data block (Y-block) including various lab analysis results as well as an overall label of "good batch" or "failed batch" assigned to the subject batch.

Embodiments can also clean the measurement dataset by identifying bad data slices and excluding the bad data slices, e.g., slices with invalid or missing values. An embodiment performs batch data alignment to generate a cleaned and time-aligned batch dataset. Each batch from the cleaned and time-aligned batch dataset is labelled and encoded according to a result of batch-end product quality, e.g., a lab determined result, of each batch.

In an embodiment, one or more EFs of the batch process, or KPIs are created. Each EF or KPI includes a given EF/KPI name (e.g., as a derived variable) and calculated values from one or more sensor measurements at one or more specific point in time in a batch process. For example, a batch phase start or end point, and a switch triggered time, amongst other examples. Generating EF/KPIs can include, for non-limiting example, snap shotting values of one or more sensors at one or multiple points in time during a batch process, snap shotting a ratio of a completed phase length over a reference batch length of that phase, a temperature, a pressure, or an agitator speed over the batch profile, amongst other examples. Such functionality may also include generating a EF/KPI represented batch dataset which is a subset or whole of the cleaned and time-aligned batch dataset.

An embodiment splits the EF/KPIs represented batch dataset into a training dataset and testing dataset using a machine learning random sampling algorithm. Such an embodiment then applies an AI data classification algorithm (K-Nearest Neighbors (KNN) or Support Vector Machine (SVM), etc.) onto the defined EF/KPIs of the cleaned batch training dataset. The trained classification (e.g. KNN, or SVM) model is tested for end-batch product quality prediction using the reserved test batch dataset.

If the quality of the model is sufficient, embodiments can proceed with deploying the classifier. However, if the quality of the model is insufficient, an embodiment re-trains the batch classifier model with one or more adjustments to the batch dataset, EF/KPI selection, and/or AI algorithm selection.

According to an embodiment, deploying a batch classifier model includes monitoring one or more running subject batch(es) with repeatable predictions on the batch-end product quality. The deploying may include performing partial-batch time alignment at a current batch time and calculating selected EF and KPI values up to the current batch time. Such an embodiment feeds available and fresh input (Z-block and partial X-block) data, e.g., live data of the batch process, into the batch model and the batch model predicts batch-end product quality. These predictions may have corresponding probabilities. Probabilities on failed batch predictions indicates risk level (or severity) in the determined predictions of batch quality.

An embodiment may also evaluate the chance of the current subject batch to develop into an operational "in-specification" batch. Such an embodiment may also pause and wait for a next cycle or event/manual trigger and, after the pause, once again predict if the end product quality is going to be "in-specification". Embodiments may also determine and obtain a set of "K-Nearest Neighbors" batches if the predicted current batch product quality is with high probability (beyond a threshold, e.g. $p>0.5$) to be "out-of-specification". Such an embodiment performs statistical analysis on a sub-dataset of the "K-Nearest Neighbor" batches around the current subject running batch. An embodiment also determines and obtains another sub-dataset, e.g., the K-Nearest Neighbor batches around a "golden-batch" (e.g., a statistical mean or median centers of a group of "in-specification" batches), as reference (Ref-batches). The current-batch is compared with a set of Ref-batches by building one or more multivariate statistical model(s), for example, PCA, PLS. This allows an embodiment to identify major contributing factors to the differences or deviations of the current subject running batch versus the "Golden-Batch" group.

Embodiments can issue alerts to batch operators that include risk assessments of the probability of the subject current batch becoming an "out-of-specification" batch and can report the statistical analysis results regarding the major contribution factors as potential root-causes. Embodiments can also provide actionable advice to batch operators based on the statistical analysis results and historical "what-if" knowledge database(s) or libraries.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A detailed description of example embodiments follows.

The teachings of all patents, published applications, and references cited herein are incorporated by reference in their entirety.

Batch production processes play an important role in many industries, such as special chemicals, pharmaceutical, food and biological products, polymer processing, semiconductor manufacturing, and metallurgy, amongst other examples. Therefore, developing and deploying advanced modeling, monitoring, and control systems in batch production processes is desirable and would be very beneficial to many manufacturers.

A batch process is a process with a start time and end time point and some evolution of variables in between. Typical batch process examples are often seen in the manufacturing industry of special chemicals, pharmaceuticals, blending and mixing, polymer processing, semiconductor manufacturing, and processing of food products, amongst other examples. In contrast to mass production, batch production processes offer manufacturers many advantages. For example, batch production provides (i) flexibility to produce high-margin products, but in smaller quantities, (ii) ability to leverage multiple capabilities, (iii) easier quality-control, and (iv) reduced waste, amongst other examples.

Figure 1:
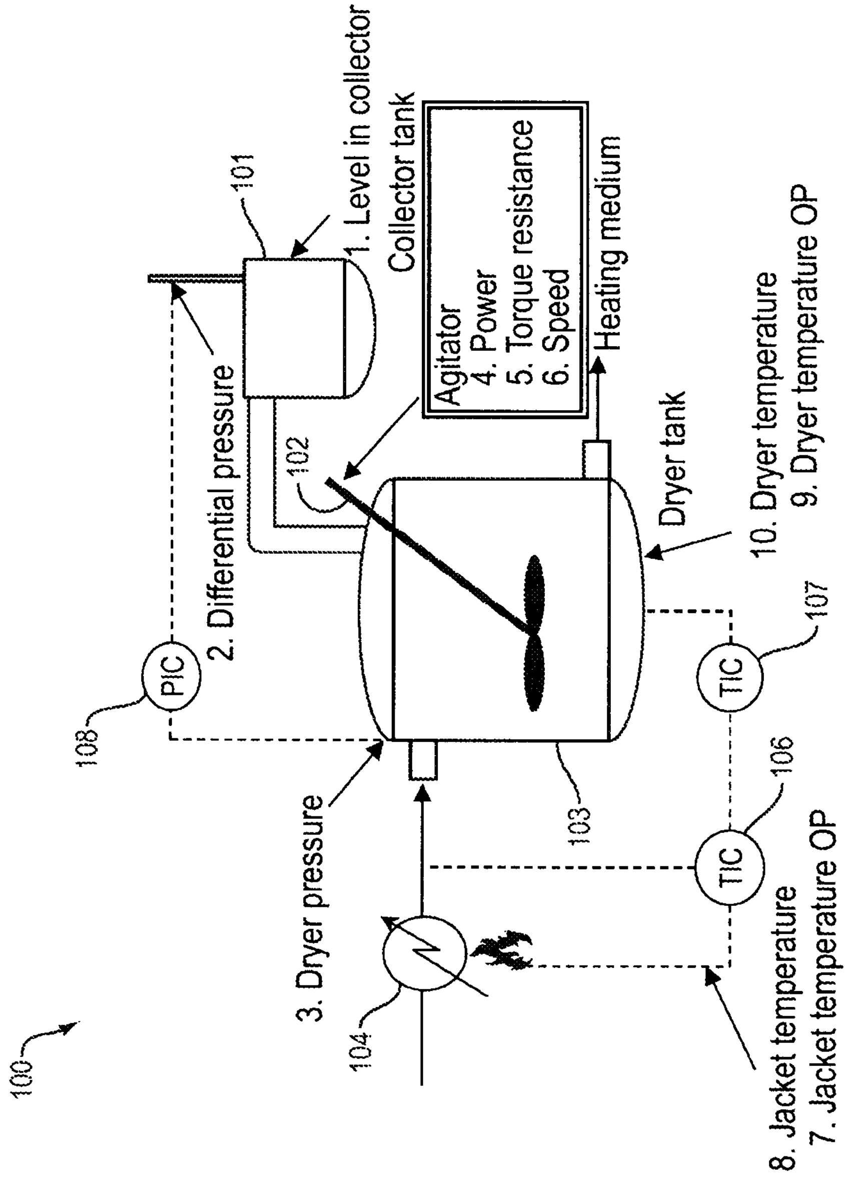
FIG. 1 is a simplified diagram of an industrial batch production process that may be controlled using embodiments.

FIG. 1 illustrates an example reactor/dryer batch process 100. The system 100 is an example of a batch process that a manufacturer uses to produce and dry products. The system 100 includes a collector tank 101, agitator 102, dryer tank 103, and jacket 104. Several data points regarding the system 100 and elements, 101-104, therein, may be collected. These data points include collector tank level (item 1), differential pressure (item 2), dryer pressure (item 3), agitator power (item 4), agitator torque resistance (item 5), agitator speed (item 6), jacket temperature controller output (OP) (item 7), jacket temperature (item 8), dryer temperature controller output OP (item 9), and dryer temperature (item 10). In an embodiment of the system 100, the jacket temperature (item 8) is measured and fed into a temperature controller TIC (106), the controller 106 outputs a control signal OP (item 7) to execute control action on the heating burner to adjust the jacket temperature (item 8). Similarly, in an embodiment, the dryer temperature (item 10) is measured by a sensor, the dryer temperature controller 107 sends out a control signal, dryer temperature OP (item 9) to the jacket temperature controller 106. Two controllers 106, 107 work together as a cascade control loop to maintain and adjust the dryer temperature (item 10) for an optimal batch operation. Similarly, the differential pressure (item 2) and dryer pressure (item 3) are measured and controlled by another controller 108. As will be described in further detail below, embodiments can be used to control the batch production process 100 using collected values of the data points (items 1-10).

Unlike continuous processes, batch production processes, e.g., the system 100, have many special characteristics which make them unsuitable for monitoring, control and optimization using existing modeling approaches. For example, the product quality of a running batch is unknown until the end of a batch process. In today's industrial practices, the rate of failed batches is high and some batch production processes, (e.g., in food processing and special chemical productions) have a 30-50% failure rate, e.g. products produced by the batch process do not meet product specifications.

For batch process monitoring and optimization, special technologies have been developed in an attempt to improve batch process quality. For example, PCA and PLS multivariate statistical models are used to improve batch process monitoring and control (See Paul Nomikos, John F. MacGregor, "Monitoring Batch Processes Using Multiway Principal Component Analysis, AIChE Journal," 40(8), 1361-1375 (August 1994)). Similarly, batch-specific industrial software tools, such as Aspen ProMV®, are used for Multivariate Statistical Process Control (MSPC) for batch processes. A recent work developed by the Applicant, has made a significant progress in this space and addressed batch process modeling and batch data alignment issues using a systematic method with improved efficiency (See Castillo Castillo et al., U.S. Patent Publication No. 2019/0332101 entitled "Computer System and Method For Automated Batch Data Alignment In Batch Process Modeling, Monitoring And Control," the contents of which are herein incorporated by reference). The functionalities in U.S. Patent Publication No. 2019/0332101 provide a comprehensive method (and system) that address many steps of batch data alignment and automated workflows while still being suitable for both offline batch data alignment for modeling and online batch data alignment for process monitoring and control.

While progress has been made to improve batch process monitoring and control, there are still numerous issues that have been observed in practice with industrial applications. One issue with traditional "golden-batch" approaches or multivariate statistical MSPC techniques, is a focus on modeling only those successful "in-specification" batches. These models (built only using "in-specification" batch data) are used to monitor and detect batches with abnormal behaviors. As a result, such implementations are only able to issue anomaly alerts to users. Very limited information, if any, about what, how, and why the anomaly is happening is provided. Another frequent problem in existing batch monitoring systems is the generating of too many false alerts due to reliance on pure statistics-based rules and thresholds that are built upon statistical assumptions on ideal data properties. Further, both "golden-batch" approaches and MSPC models lack the ability to provide a deep-diving root-cause-analysis after an alert is issued. Yet another problem is the inability of existing methods to predict whether the end-batch product will be "in-spec" or "out-of-spec" during an ongoing batch process.

These problems are challenging to batch product manufacturers and lead to a high rate of "out-of-spec" batches. These out of specification batches are very costly, waste resources, and negatively impact profits. Therefore, it is desirable to develop and provide manufacturers with new techniques that improve the monitoring and control of batch production processes so as to reduce the number of "out-of-spec" batches. Embodiments provide such functionality.

Figure 2:
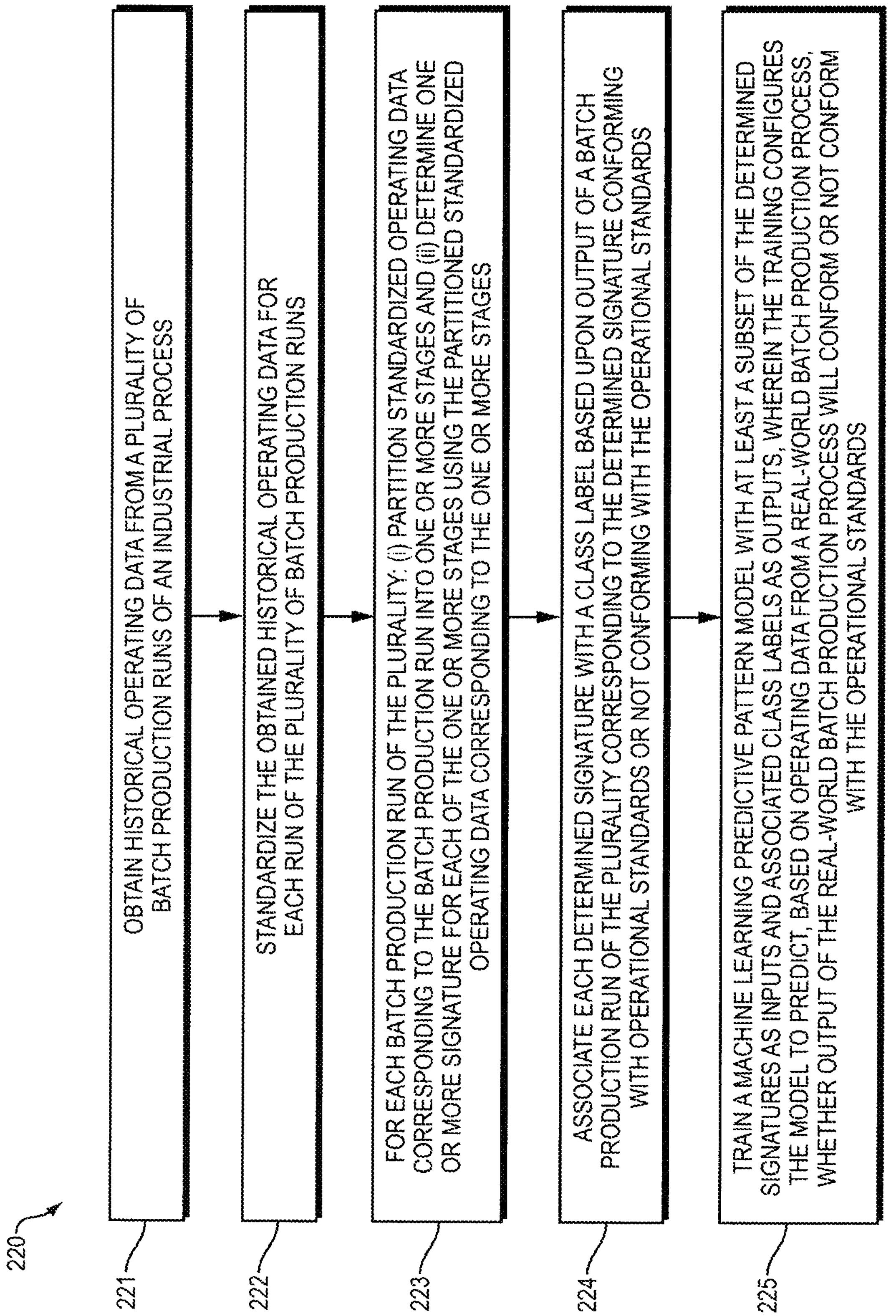
FIG. 2 is a flow chart of an example embodiment for creating a machine learning predictive model for real-world industrial batch production process monitoring and optimization.

FIG. 2 is a flow chart of one such example method embodiment 220 that provides functionality that creates a machine learning predictive model for real-world batch production industrial process monitoring and optimization. Embodiments of the method 220 can be configured to control any batch production process in any industrial settings known in the art, such as the system 100 described hereinabove in relation to FIG. 1.

The method 220 begins at step 221 by obtaining historical operating data from a plurality of batch production runs of an industrial process. At step 222, the method 220 standardizes the obtained historical operating data for each run of the plurality of batch production runs. In turn, at step 223, for each batch production run of the plurality, the method 220 (i) partitions standardized operating data corresponding to the batch production run into one or more stages and (ii) determines at least one signature, i.e., one or more respective signatures, for each of the one or more stages using the partitioned standardized operating data corresponding to the one or more stages. According to an embodiment, there are one or more different signatures determined for the different stages. To continue, at step 224 each signature is associated with a class label based upon output of a batch production run of the plurality corresponding to the determined signature conforming with operational standards or not conforming with the operational standards. Next, the method 220 trains 225 a machine learning predictive pattern model with at least a subset of the determined signatures as inputs and associated class labels as outputs. The training 225 configures the model to predict, based on operating data from a real-world batch production process, whether output of the real-world batch production process will conform or not conform with the operational standards.

The method 220 is computer implemented and, as such, the functionality and effective operations, e.g., the obtaining (221), standardizing (222), partitioning and determining (223), associating (224), and training (225), are automatically implemented by one or more processors. Moreover, the method 220 can be implemented using any computing device or combination of computing devices known in the art. Amongst other examples, the method 220 can be implemented in cloud computing configurations and the computer network environment described hereinbelow in relation to FIG. 9.

The historical data may be obtained at step 221 from any point(s), e.g., storage memory, communicatively coupled to one or more computing devices implementing the method 220 or point(s) that are capable of being communicatively coupled to the one or more computing devices implementing the method 220. Further, in an embodiment, the obtained historical operating data is collected from one or more sensor measurements. Considering the illustrative system 100, at step 221, an embodiment of the method 220 obtains the data (items 1-10) from multiple runs of the batch process. The data may be collected from one or more sensors in the system 100 and stored in memory that is accessed, at step 221, by a computing device implementing the method 220.

According to an embodiment, for each batch production run of the plurality, the obtained historical operating data is configured to include: (i) batch initialization data, (ii) batch progress data, and (iii) batch end product quality data. Example historical operating data that may be obtained is shown in the plots 331*a*, 332*a*, and 333*a* described hereinbelow in relation to FIG. 3.

Embodiments of the method 220 may perform a variety of different operations at step 222 to standardize the historical operating data obtained at step 221. In an embodiment, the standardizing 222 aligns the obtained historical operating data for each batch production run of the plurality with a specified standard reference batch over time. An example of the alignment is illustrated and described hereinbelow in relation to FIG. 3. As part of the standardizing 222, another embodiment of the method 220 detects and removes outlier runs from the obtained historical operating data. According to yet another embodiment, the standardizing 222 includes labeling each batch production run of the plurality with a class label. Said class labels indicate whether output of the batch production run conforms with operational standards, e.g., product specifications, or does not conform with the operational standards. In another embodiment, when the historical data is obtained 221, said data has the class labels associated therewith.

According to an embodiment determining one or more signature for each of the one or more stages using the partitioned standardized operating data at step 223 comprises generating one or more engineering features (EFs) or Key Performance Indicators (KPIs), using the partitioned standardized operating data corresponding to the one or more stages. In such an embodiment the generated EFs and/or KPIs are grouped into a set to form a given signature. In an embodiment, each signature is defined for a specific point in time in a batch process. Returning to the example system 100, a signature may be dryer temperature maximum (peak value)(item 10) at the end of phase-2 of the batch process (332*a* and 332*b* in FIG. 3). Before the end of phase-2, the dryer temperature maximum measurement would not be a valid signature. Consequently, the signature of dryer temperature maximum is not be available until the end of phase-2 and the value of the signature is fixed at that point in time.

According to an embodiment, a set forming a signature is an expandable set. In such an embodiment, grouping the generated one or more EFs or KPIs into the expandable set to form the signature 223 includes: (i) adding the one or more EFs or KPIs into the expandable set over time as the one or more EFs or KPIs are generated and (ii) assigning a weight to each of the generated one or more EFs or KPIs in the set. According to one such embodiment, the expandable set increases in size over time with progress of a given batch production run. In other words, as a batch progresses into a new stage (e.g. next phase) additional historical operating data with increased batch time is obtained 221 and standardized 222, this newly acquired data is partitioned and signatures are determined for the new data at step 223. The new EFs and/or KPIs for the newly acquired, standardized, and partitioned data are added to an expandable set to form a signature over the increased batch length up to the increased batch time.

Another embodiment of the method 220 further includes receiving input indicating a selected signature type. This selected type of signature is then determined at step 223. In an embodiment, at step 223 batch signatures are determined using either an automated approach (which may be the default methodology) or a selection by user, e.g., batch operator, approach. In the automated approach, sensor measurement values collected at particular times are considered signatures or elements of signatures. In such an embodiment, the sensor measurement values collected at the particular sampling times are preset. Then, when determining signatures at step 223, these measurement values at the preset times are identified from the partitioned standardized operating data. In the user selection based approach, at step 223, the method 220 relies on user provided indications of sensor measurements at specific time points, e.g., start or end points of a batch phase, to use for the signatures. In such an implementation, at step 223, the user indicated sensor measurements at the specific points in time are obtained from the partitioned standardized operating data. The obtained data is then set as the signatures. Moreover, obtained data, i.e., the values from the particular points in time, may be combined to form a signature for the one or more stages. This combination may be done automatically or may be based on user input.

According to an embodiment, each signature is determined at pre-defined points of each stage of the given batch production process. In an embodiment, stages are key points in time within a batch process. Example stages include start of a batch run, first phase completion, and completion of half of the batch run, amongst other examples. The stages can be defined as a snapshot status of a batch run, or completion of a sub-processes (e.g., phases) in a batch process (batch run). Moreover, the stages can be time (batch progress time) relevant.

To illustrate step 223, once again consider the example system 100. In this illustrative example, dryer temperature (item 10) and agitator power (item 4) at the start of a second phase form a signature. In such an embodiment, the historical data for the dryer temperature and agitator power is received (221), standardized (222), and partitioned, such that the dryer temperature and agitator power at the start of the second phase is separated from the dryer temperature and agitator power data during different points in time of the process 100. For each batch production run, i.e., each batch run for which data is acquired and standardized, a respective signature is determined by combining the dryer temperature measurement and agitator power measurement in a vector.

At step 224, the method 220 associates each determined signature with a class label. The class labels indicate whether a batch corresponding to the signature, i.e., the batch data from which the signature was derived, conforms or does not conform with operational standards. In an embodiment, the operational standard is at least one of: a physical criterion and a chemical criterion. For instance, the operational standard may be a certain quality or purity level for an end product. The associating 224 may include linking or otherwise associating in memory some indicator of whether the batch corresponding the signature meets or does not meet specifications. This may be done by simply using a single bit indicator where "0" indicates not conforming and "1" indicates conforming.

To illustrate, consider a simplified scenario where there are two batches "A" and "B." The historical data from batches A and B is obtained at step 221 and standardized at step 222. This standardized data is partitioned at step 223 so that batch A and B have data corresponding to two stages, A1 and A2, and B1 and B2. Signatures are then determined using the data resulting in the signatures SA1, SA2, SB1, and SB2. At step 224, if batch A conforms with specifications, and batch B does not conform with specifications, the signatures may be linked with indicators, e.g., a single bit indicator where "0" indicates not conforming and "1" indicates conforming, 1-SA1, 1-SA2, 0-SB1, and 0-SB2. This associating may be done in storage memory or in any other matter so as to indicate that the signature comes from a batch that conforms or does not conform with operational standards.

According to an embodiment, the training at step 225 begins by first splitting the determined signatures with their associated labels into training and testing sub-datasets. The training sub-dataset is the subset of the determined signatures used for the training at step 225. In an embodiment, the machine learning predictive pattern model is trained with a K-Nearest Neighbor (KNN) and Support Vector Machine (SVM) supervised-learning algorithms by feeding determined signatures from the training sub-dataset into the at least one machine learning predictive pattern model as inputs and associated class labels as outputs. Such an embodiment creates a KNN trained classifier model and a SVM trained classifier model. According to an embodiment, the KNN model is a primary model used for deployment and the SVM model is a secondary model used for validation of the primary model. In an embodiment, the training is carried out using supervised machine learning known in the art. The training may also include validating the trained machine learning predictive pattern model with the testing sub-dataset and fine-tuning KNN and SVM model parameters.

Embodiments of the method 220 may also deploy the predictive model trained at step 225. One such embodiment automatically receives sensor data from an ongoing batch production run of the industrial process. The received sensor data is processed with the trained machine learning predictive pattern model to determine a prediction of output quality of the ongoing batch production run, i.e., predict whether output of the batch will conform or not conform with operational standards. In an example embodiment, the determined prediction includes an indication of statistical probability, i.e., confidence, in the determined prediction.

An embodiment of the method 220 may provide guidance to users based on the prediction (i.e., conforming or non-conforming) determined by the deployed trained model. One such embodiment issues an alert to a user if both (i) the determined prediction indicates the output is non-conforming and (ii) the indication of statistical probability in the determined prediction is above a threshold, e.g., greater than 50% probability that the predicted outcome is true positive. Yet another embodiment, at a current batch progress stage of the ongoing batch production run, examines the indication of statistical probability in the determined prediction and performs an online root-cause analysis if: (i) the determined prediction indicates the output is non-conforming and (ii) the indication of statistical probability in the determined prediction is above a threshold.

In yet another embodiment, if the determined prediction indicates the output is non-conforming and (ii) the indication of statistical probability in the determined prediction is above a threshold, the method 220 determines, from among the historical operating data, at least one K-nearest neighbor batch to the ongoing batch production run. Then, based on the determined at least one K-nearest neighbor batch, a comparative analysis between the at least one K-nearest neighbor batch and a standard reference batch is performed by using at least one multivariate statistical model. In such an embodiment, the K-nearest neighbor batch is similar to the current batch being analyzed. As such, based on the comparison between the K-nearest neighbor batch and a standard reference batch, such an embodiment can identify, for example, what is wrong with the current batch. This information can be used to provide recommendations to fix the current batch.

Another embodiment of the method 220 deploys the trained machine learning predictive pattern model online in the industrial process at one or more pre-specified points in time of a batch run. In other words, in such an embodiment, the deployed machine learning model is used to predict output quality when enough data to determine one or more signatures is available. To illustrate, if a signature is reactor temperature upon completion of a first stage of a batch process, such an embodiment uses all available measurement data up to this point, together with the just received reactor temperature measurement at the completion of first stage. Such an embodiment feeds these available signatures from data, i.e., features measured up to the pre-specified time point, from a current batch run into the model and uses the deployed trained machine learning predictive pattern model to predict whether output of the batch run of the industrial process will conform or not conform with the operational standards. In such an embodiment, real-time batch monitoring and analysis is executed based on the prediction of whether the batch will conform or not conform. This analysis includes at least one of (i) diagnosing one or more operational problems in the batch run of the industrial process and (ii) providing prescriptive guidance to a plant operator with one or more recommended corrective actions. According to an embodiment, diagnosing one or more problems and providing prescriptive guidance to a plant operator includes identifying one or more contributing KPIs and outputting an alert to the plant operator with an associated risk assessment report. Risk assessment reports may indicate statistical probability that output of the current batch will not conform with operational standards, a root-cause analysis that lists features, e.g., measured sensor values, with significant deviations from standard golden-batch features, and recommendations of corrective actions, amongst other examples.

An embodiment determines the corrective actions by using the trained KNN model to look in a historical database to find a small group of "similar" batch runs to the batch run being analyzed (based on signatures up to the current point in time). The small group of identified "similar" batches is split into two groups: "good" and "bad" batch groups according to whether each batch run end-product quality is acceptable or not acceptable. These good and bad similar batches are compared to identify the differences after the current time point in operation. This allows such an embodiment to statistically identify how bad batches deviated from good batches. For example, such an analysis may identify that one or more features e.g., dryer temperature, pressure, longer/short cooking/drying time, etc., of the bad batches deviated from those features of the good batches. These findings are then inserted into the recommendation report (e.g., automatically using numerically quantitative calculations) to generate the recommendation report. Further, an embodiment can automatically carry out these recommended actions.

Embodiments, e.g., the method 220, leverage historical batch data to train the predictive machine learning model. The plots 331*a*, 332*a*, and 333*a*, illustrate historical batch data that may be employed in embodiments. Specifically, the plots 331*a*, 332*a*, and 333*a*, show process variables of collector level 334*a*, dryer temperature 335*a*, and agitator speed 336*a* versus time 337*a*. Each series (indicated by the different colors) in the plots 334*a*, 335*a*, and 336*a*, corresponds to a different batch process run.

Figure 3:
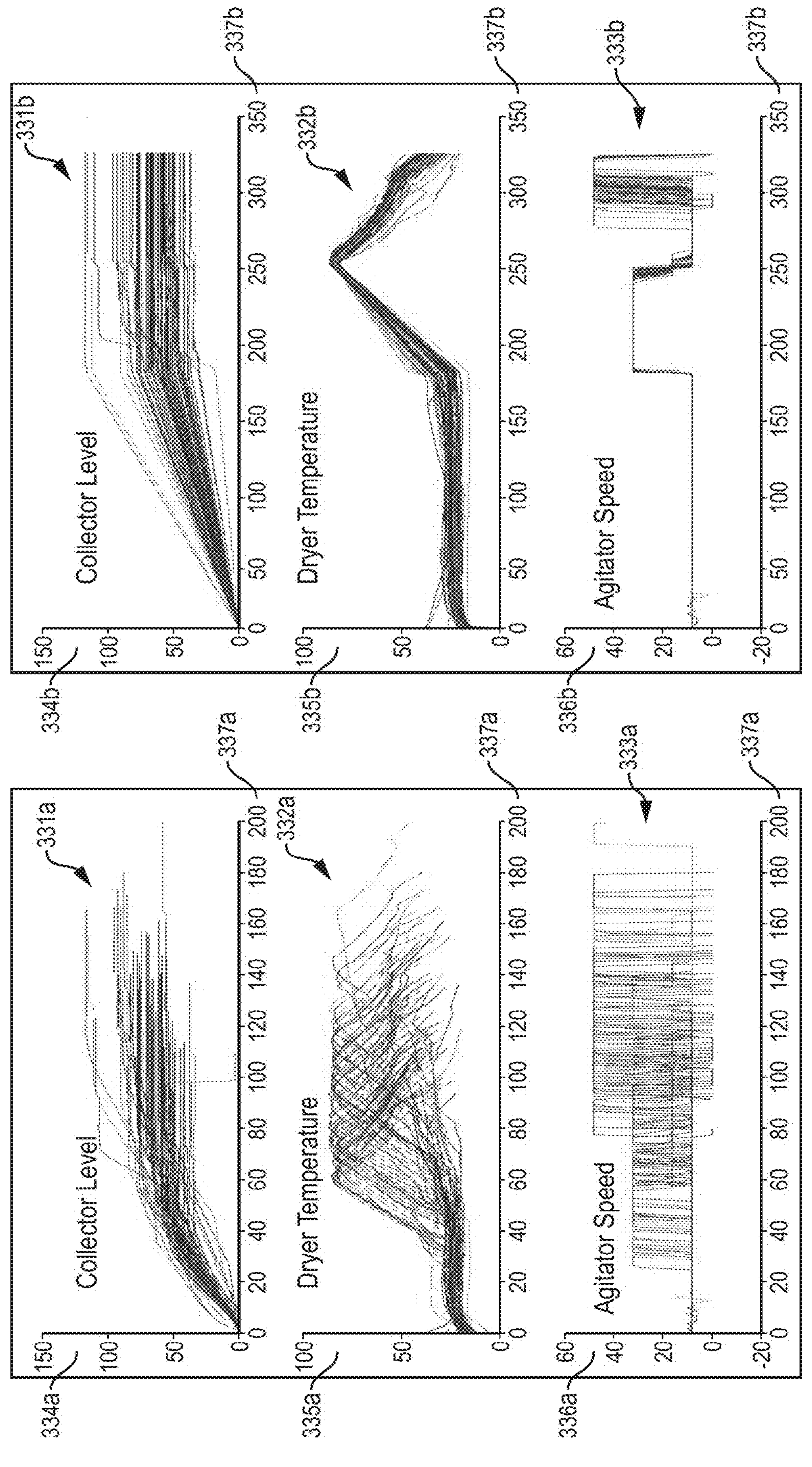
FIG. 3 are plots of process variables illustrating alignment that is performed in an embodiment.

Further, as noted above, embodiments may standardize, e.g., at step 222 of the method 220, the historical data. Amongst other examples, this standardizing may include aligning the original historical data (e.g., the plots 331*a*, 332*a*, and 333*a*) using the functionality described in Castillo Castillo et al., U.S. Patent Publication No. 2019/0332101 and Ma et al., U.S. Patent Publication No. 2022/0035348, the contents of which are incorporated herein by reference in their entirety. FIG. 3 illustrates the result of this alignment functionality. The plots 331*b*, 332*b*, and 333*b*, show process variables of collector level 334*b*, dryer temperature 335*b*, and agitator speed 336*b* versus time 337*b*. The plots 331*b*, 332*b*, and 333*b* are the time aligned versions of the plots 331*a*, 332*a*, and 333*a*, respectively.

Figure 4:
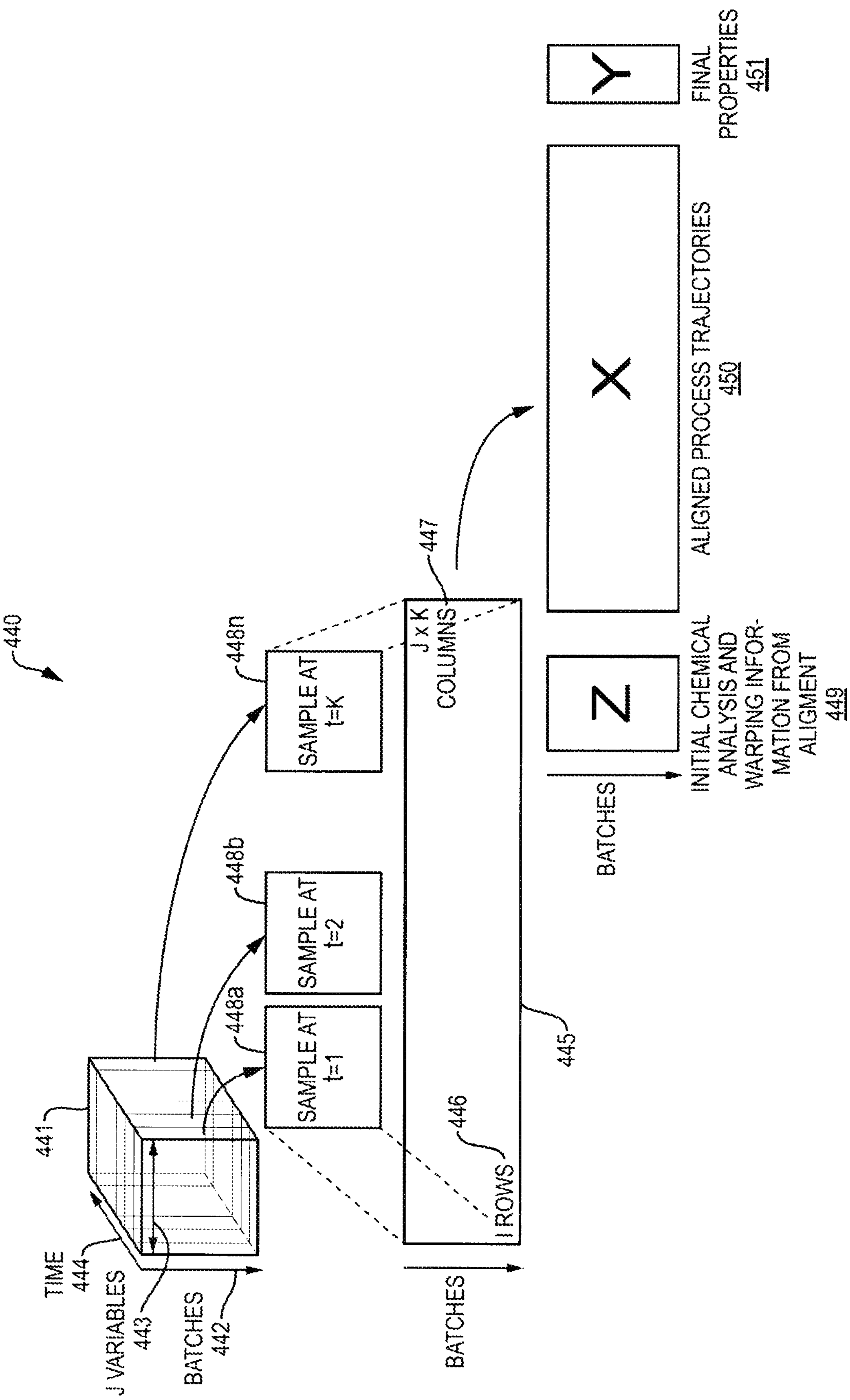
FIG. 4 illustrates an example method of batch variable data unfolding that may be employed in embodiments.

Another data standardizing method that may be employed in embodiments is the data unfolding method 440 illustrated in FIG. 4. Before the unfolding method 440 is performed, the raw data 441 which is unfolded to form the X-block 450 is three-dimensional and, thus, the raw data 441 cannot be processed equally with raw batch initialization data that is used to form the Z-block 449, which is two-dimensional. After performing the unfolding method 440, X-block data 450, Z-block data 449, and Y-block data 451 are two-dimensional and in normal modeling and regression formats.

The method 440 begins with the original three-dimensional data structure 441 which has height in batches 442, width in variables 443, and depth of time 444. The method 440 unfolds the three-dimensional data structure 441 and creates the two-dimensional data structure 445 with rows 446 and columns 447. Each row 446 pertains to a batch and each column 447 pertains to a value of a variable for all batch at a particular point in time. As shown in FIG. 4, the multiple variable sample values 448*a* (t=1), 448*b* (t=2), and 448*n* (t=K) are being unfolded into the two-dimensional data matrix 445. The two-dimensional data matrix 445 can then be further arranged to form data blocks 449 (Z-block), 450 (X-block), and 451 (Y-block). The block 449 is data indicating batch run initial chemical analysis measurements, feed stocks, and batch operational conditions for initiation. The block 450 is data indicating the aligned process trajectories of process variables. The block 451 is the final properties measurements of the batch product.

Figure 5A:
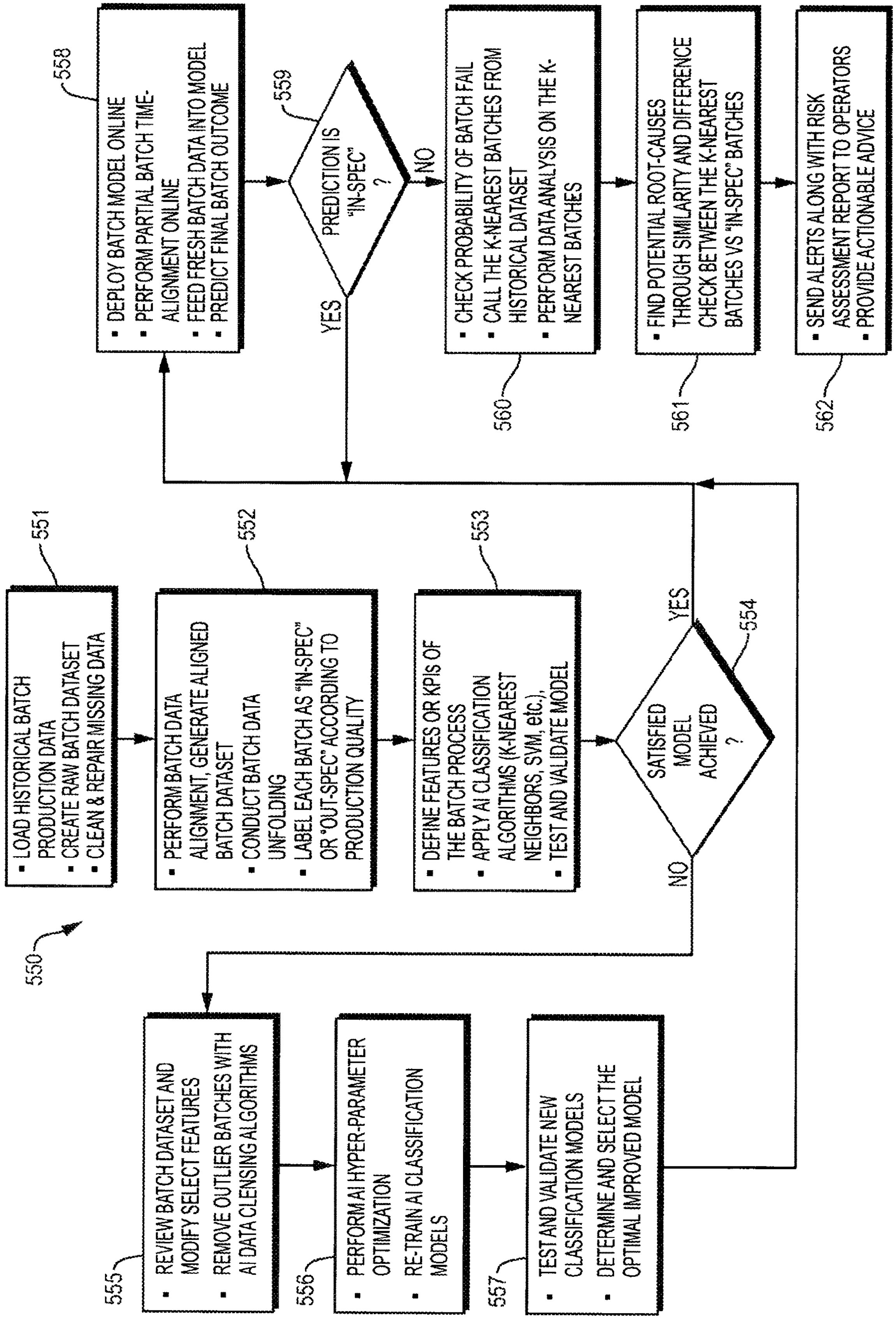
FIG. 5A is a flow diagram of an example method embodiment for performing batch modeling and online predicting of batch quality.

Embodiments provide functionality for performing automated batch monitoring and prediction of batch process end-product quality. FIG. 5A is a flow chart of an example computer-implemented method embodiment 550 for building a predictive model and performing automated running batch monitoring and prediction according to an embodiment. The method 550 begins by loading 551 historical batch production data for an industrial batch process and creating, cleaning, and repairing batch datasets where necessary in the loaded historical data. To continue, at step 552 batch data alignment is performed. In an embodiment, the alignment 552 is performed using the techniques described in Castillo Castillo et al., U.S. Patent Publication No. 2019/0332101 and Ma et al., U.S. Patent Publication No. 2022/0035348. Additionally, at step 552 each batch is labeled "in-spec" or "out-of-spec" according to production records and lab analysis results (e.g. data block Y, 451 of FIG. 4). Next, at step 553, feature engineering and batch signature metrics, e.g., KPIs, are defined. Also at step 553, a batch classifier model is trained using supervised machine learning methodologies, e.g., K-nearest neighbors algorithm, support vector machines algorithm, etc. Model validation and testing are also performed at step 553 using a reserved portion of the batch dataset.

Step 554 checks if the trained model satisfies model criterion. Example criterion include the trained model prediction accuracy, for both training and validation datasets, satisfying a pre-specified threshold, e.g., true positive greater than 80%. If the model satisfies the model criterion, the method 550 moves to the deployment step 558 where the trained batch classifier model is used in an online deployment. If step 554 determines the trained batch classifier model does not meet the model criterion, the method 550 moves to step 555. At step 555 a user reviews the selected batch dataset and the selected features, i.e., the EFs and KPIs used as signatures, are re-tuned, i.e., modified. This re-tuning may include increasing or decreasing the number of features from the signature vector and adjusting weightings of included features, amongst other examples. Further, at step 555 batches with variable outliers are cleaned up using one or more AI data cleansing algorithms, such as PCA and Local Outlier Factor (LOF) algorithm. In addition, the method 550 may move to step 556 where a user performs AI Hyper-parameter optimization on the feature and signature metrics and AI classifier model training parameter values to find a set of optimal parameter values. At step 556 these optimal parameter values are used to re-train the batch classifier, i.e., predictive model. This retrained model is validated and tested at step 557 with a validation portion of the dataset. Further, at step 557 the model, which is improved in comparison to the model rejected at step 554, is selected for deployment and the method 550 moves to step 558.

Once a batch classifier model is deployed at step 558, for one or more running batches in production at any specified time point (e.g., batch starting, phase-end, half-way or near complete, and such), the method 550 obtains data for the current batch. The data for the current batch may include batch ingredients and compositions for batch initialization and available batch variable trajectories, if the batch is in progress. The method 550 performs partial-completed batch data time alignment, e.g., using the techniques described herein. After batch time alignment, all time-aligned batch process variables (e.g., a front portion, i.e., the available data, of the data block 450 of FIG. 4) and batch initial condition data (e.g., data block 449 of FIG. 4) are fed into the trained batch classifier model. The model generates a prediction regarding batch end-product quality. At step 559, if the batch product quality is predicted to be "in-spec" with high probability, meaning the running batch operation is acceptable, the method 550 returns to step 558 and continues deployment. In an embodiment, this continued deployment includes waiting for a next specified point in the batch process to repeat steps 558 and 559 until the batch process run is complete.

If, at step 559, it is determined that the batch product quality is predicted to be "out-of-spec", the method 550 moves to step 560. At step 560, the method 550 performs any number of analyses, including at least one of: (i) checking the probability level that the running batch will fail; (ii) calling and labelling the K-nearest neighbor batches from historical batch data, which are highly-similar to the current running batch in terms of features and signature metrics; and (iii) performing batch data analytics on those K-nearest neighbor batches. The method 550 at step 561 identifies feature and signature metrics with significant differences between in-spec and out-of-spec batches among those K-nearest neighbor batches. To illustrate, in one such embodiment it is determined that dryer temperature values of a group of K-nearest neighbor batches are found to be lower than those of a group of "in-spec" normal batches. The method 550 also determines the deviations of the current running batch from those "in-spec" batches. For example, dryer temperature **335*b* in the plot 332*b* at t=250 (half way through phase-2) in FIG. 3 is showing significant deviation (e.g. 85° C.) vs. standard value of 90° C. from a golden batch. To continue, the method 550 issues one or more alerts to user(s) at step 562**. Alerts may include summarized findings and corresponding action recommendations to help the user(s) correct and improve the current running batch production at an early stage. For example, an alarm may include a warning of "dryer temperature at point t=250 is significantly lower than normal" and recommended corrective actions may include "raising dryer temperature by 5° C.".

As part of providing actionable advice at step 562, the method 550 may be programmatically used by a process controller to adjust temperature, pressure, feeds, agitation/stirring, and other such parameters of a batch run. For example, if the root cause analysis determines that temperature of a reactor is approximately 5° C. higher than average in-specification batches, the method 550 may automatically lower temperature of the reactor in response to this determination. The process controller may be programmed to automatically adjust batch parameters to move batch operation parameters towards average good batch values.

More detailed technical descriptions of the functionality that may be implemented during steps of the method 550 and embodiments is provided below in relation to FIGS. 5B, 5C, and 5D.

Figure 5B:
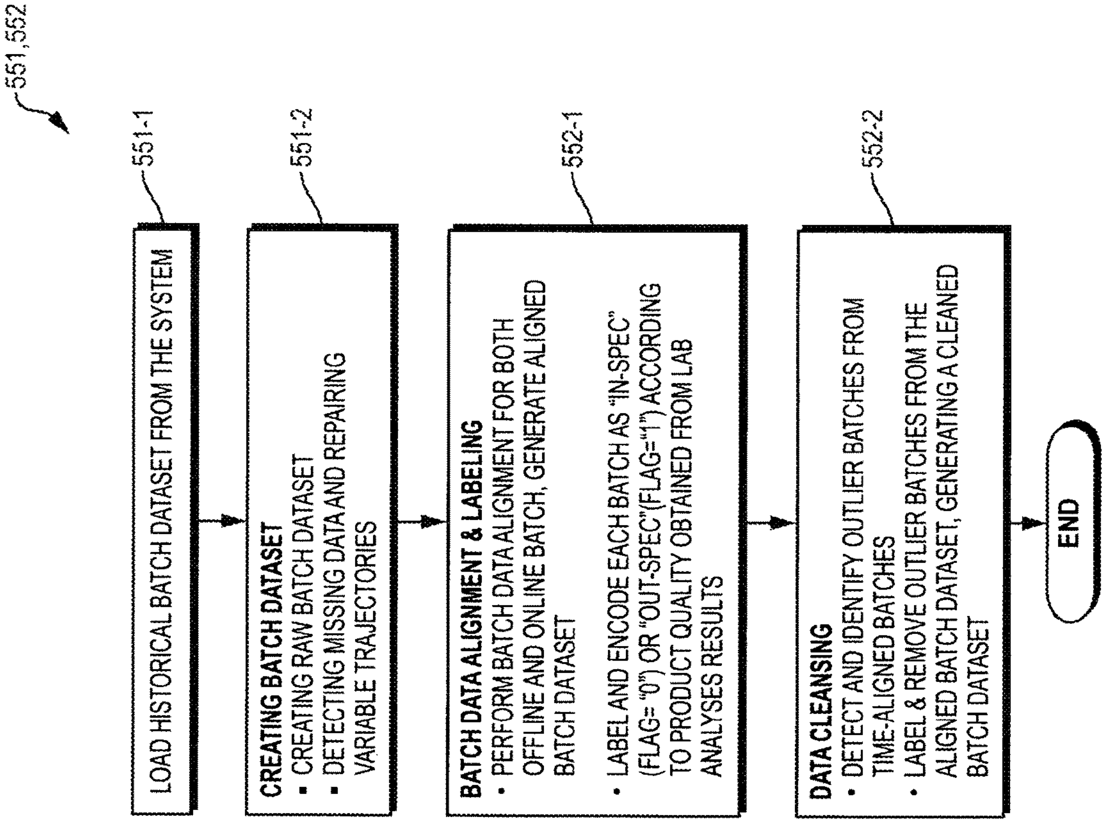
FIG. 5B is a flow diagram illustrating an example workflow for batch data pre-processing that may be employed in the method of FIG. 5A.

FIG. 5B shows a detailed workflow of steps 551 and 552 for data preparation in the method 550 for building a batch (classifier) model. The workflow 551,552 of FIG. 5B includes 551-1 loading historical batch operation data. This loaded data may include initial ingredient amount and concentrations added into the batch reactor/container at beginning of each batch along with other initial operation conditions at the starting point of a batch. In addition, the loaded data may include various variable trajectory values recorded during the batch process, variable trajectory values for a specific segment of a batch process (e.g., phase-end point), and specified product concentrations at the end of each batch. The loaded 551-1 data can also include the batch results. The loaded batch result may also be associated with an indicator of product quality, such as "in-spec" or "out-of-spec".

Next, the method 551,552 creates a raw batch dataset at 551-2 by forming three data matrices with corresponding loaded batch historical data. This may be done using the data unfolding method 440 described hereinabove in relation to FIG. 4. According to an embodiment, the created raw batch dataset contains the three data blocks shown in FIG. 4, i.e. Batch Initiation Data Block 449 (Z-Block, dimension NB by MZ), Batch Variable Trajectory Data Block 450 (X-Block, dimension NB by NV by T), and Batch End Data Block 451 (Y-Block, dimension NB by NY), where NB represents number of batches, i.e., each data row represents a specific batch; MZ represents number of columns of Z-block; NV represents number of variables, T represents batch progress time and the number of measurement samples along the batch time, and NY represents number of columns of Y-block.

At step 551-2, embodiments also perform batch data screening and detect any missing values from each batch's Z, X, and Y data blocks. In such an embodiment, if one or more missing values are detected, embodiments may try to repair those missing values using machine learning algorithms for data imputation at step 551-2.

Embodiments next perform batch data time alignment and batch labeling at step 552-1. At step 552-1 the method 551,552 performs batch data time-alignment. This alignment may be performed using the techniques described in Castillo Castillo et al., U.S. Patent Publication No. 2019/0332101 and Ma et al., U.S. Patent Publication No. 2022/0035348. In turn, each batch in the resulting aligned batch dataset, is labeled as "in-spec" or "out-of-spec" based on the product quality values in data block-Y and a quality threshold set for production. In an embodiment, the labels are encoded. In one such embodiment, "in-spec" or "out-of-spec" are encoded as "0" and "1," respectively.

Embodiments of method 551,552 further perform batch data cleaning at 552-2. According to an embodiment, this cleaning includes detecting and identifying "outlier" batches with "out-of-scope" initial conditions or significantly different variable trajectories in a statistical sense. Further, batches with too-short or too-long batch completion time, may also be identified as outliers. The identified "outlier" batches are removed from the aligned batch dataset. As a result, a cleaned, time-aligned batch dataset is generated for batch model training and testing.

Unlike existing methodologies (such as traditional "golden-batch" approaches, or multivariate statistical modeling with PCA/PLS), embodiments can use several machine learning algorithms and models to solve the batch prediction problem. Embodiments consider the batch model for prediction as a specific pattern-recognition or batch classification problem. Therefore, embodiments may integrate methods and techniques following the machine learning workflow 553 (which is implemented at step 553 of the method 550) illustrated in FIG. 5C. The workflow 553 may include (1) Feature Engineering and Signature Extraction 553-1; (2) Machine Learning Model Training 553-2 and (3) Model Validation 553-3.

Figure 5C:
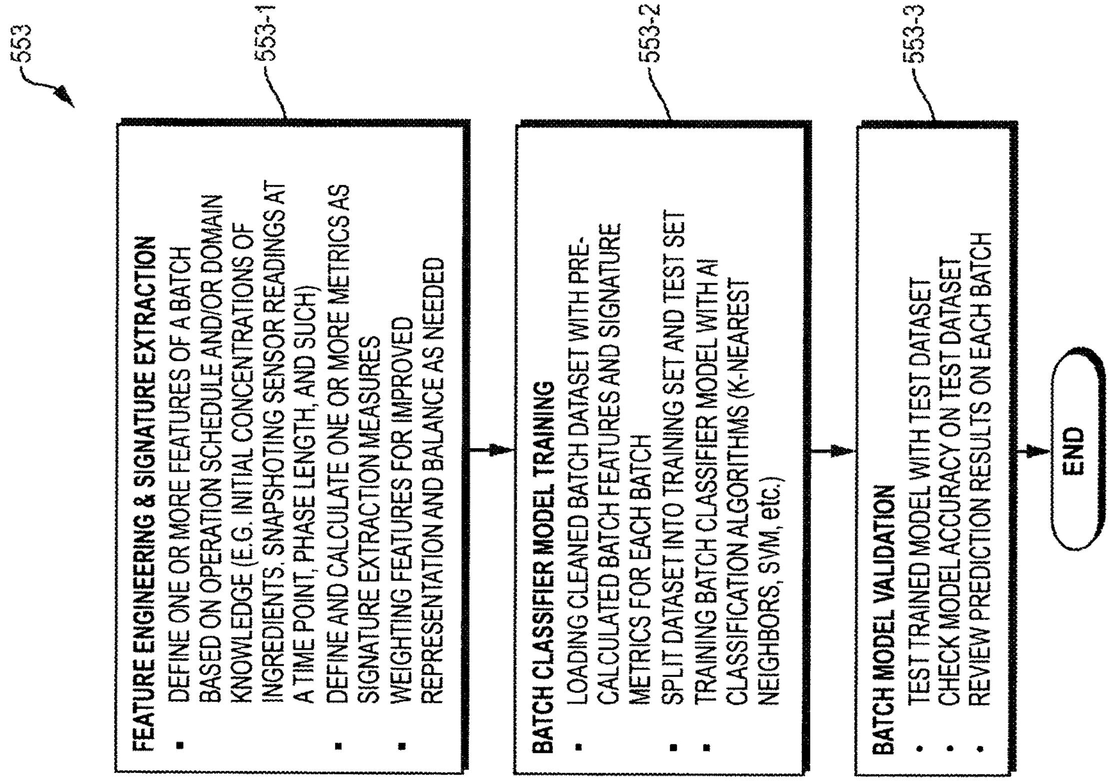
FIG. 5C is a flow diagram depicting an example workflow for determining batch signatures and building a batch quality predicting model that may be employed in an embodiment of the method of FIG. 5A.

FIG. 5C illustrates an example workflow 553 for building a batch model for online prediction of a running batch. In an embodiment, the workflow 553 is implemented at step 553 of the method 550 of FIG. 5A. The workflow 553 starts building a predictive model at step 553-1 by first performing feature engineering and batch signature extraction operations on a cleaned and batch time-aligned dataset, e.g., the dataset resulting from step 552-2 of the workflow 551,552 illustrated in FIG. 5B. The feature engineering at step 553-1 includes defining one or more features of a batch process and collecting said defined features (i.e., data indicating the defined features). Such features may include, for example, concentrations of chemicals in batch ingredients, physical properties of feed stock, operational conditions (e.g., temperature, moisture, pressure at the batch reactors, selected or all snapshot values of sensor measurements during the batch progressing). The batch features and values of magnitude of the features form a set of comparable metrics which are referred to herein as "signatures" of a particular batch. The method 553 at step 553-1 also allows users to specify different weightings (e.g. 0.0-1.0) for one or more features to represent their importance as batch "signatures". If such weightings are received, the method 553 weights and calculates all defined features in the form of a list or vector of feature engineering values for each batch of the cleaned and time-aligned batch dataset.

At step 553-2 embodiments proceed with training a model with one or more machine-learning algorithms. According to an embodiment, this model training includes: (i) loading a cleaned and feature calculated batch dataset (from 553-1), (ii) splitting the batch dataset into a training dataset and a testing dataset, and (iii) applying one or more supervised machine learning classifier model training algorithms, such as KNN or SVM. The result of training is a classifier model that predicts a batch's success (in-spec) or failure (out-of-spec) given a (partial or complete) set of feature values as inputs. The classifier is also configured to provide a probability with the predictions. These probabilities can be presented to users to allow users to (i) assess the risk of a running batch moving into failure and (ii) make early decisions to reduce the number of batch failures.

The method 553 further tests the trained batch classifier model at 553-3 using the reserved test batch dataset that was not used in the training step 553-2. An embodiment feeds available features of the test batch dataset into the trained batch classifier model and receives model predictions. These model predictions are compared against known batch results for each batch from the test dataset to determine quality of the classifier.

Figure 5D:
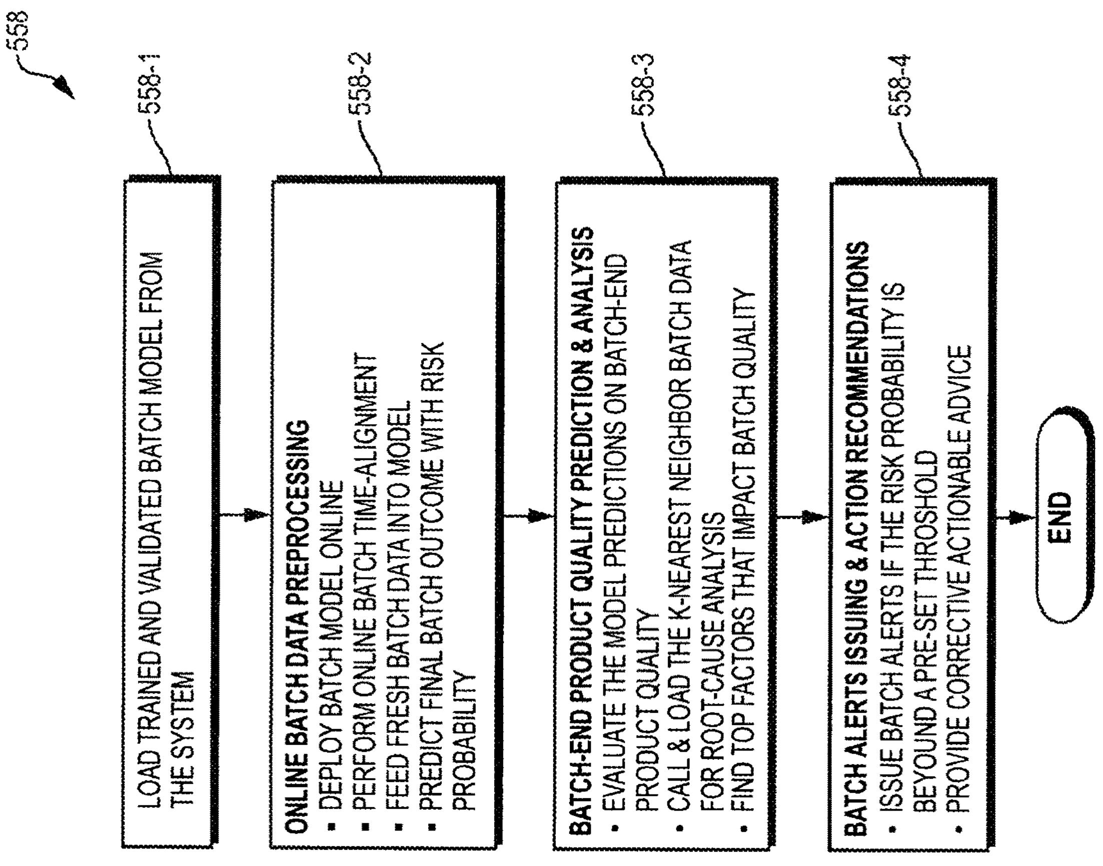
FIG. 5D is a flow diagram illustrating an example method for prediction model online deployment in a running batch that may be employed in an embodiment of the method of FIG. 5A.

FIG. 5D illustrates an example workflow 558 of deployment of a trained and tested batch model for online prediction of a running batch process. At step 558-1, the method 558 loads a trained and validated batch model, e.g., resulting from step 553-3 of FIG. 5C. At step 558-2 the loaded model is deployed online to monitor a batch process and predict quality of the batch process end-product. According to an embodiment, deploying the model online at step 558-2 includes receiving sensor data online via a data server or database, so as to feed a batch dataset into the model. Such deployment may include providing data to a computer implemented embodiment of the method 550 at step 558. In an embodiment, deploying the model at step 558-2 includes storing the model on a computing device (or server) coupled to sensors (or a distributed control system (DCS)) in a real-world batch production process and controlling the process using the methodologies described herein based on data collected by the sensors and processed through the model. At a point during progress of the batch process (e.g., a snapshot at a specific time point (for example, a batch phase ending point), a scheduled point in time, a user or event (such as an alert from the MSPC system) trigged event, etc.), the method 558 at step 558-2 performs an "in batch" time-alignment to adjust variable trajectories of the current batch, against a standard "reference batch," up to the current batch time. Once again, this alignment may be performed using the batch time alignment methods described in Castillo Castillo et al., U.S. Patent Publication No. 2019/0332101 and Ma et al., U.S. Patent Publication No. 2022/0035348.

Based on the aligned batch variable trajectories, the method 558 feeds available data values, e.g., all available data values, from the running batch (corresponding Z-block and partial X-block data) into the deployed online batch prediction model. In response, the batch prediction model, i.e., a classifier, generates predictions about the batch process end-product quality with a calculated probability. If the prediction outcome is negative ("in-spec"), the system and method 558 will do nothing and the method 558 waits for a next point in the process when analysis is done. If the classifier prediction outcome is positive ("out-of-spec"), the method 558 may further perform a root-cause analysis. The method 558 at step 558-3 and 558-4 may (1) load the cleaned and time-aligned batch dataset and select the "K-Nearest Neighbors" batches to the running batch process using a machine learning KNN algorithm; (2) create a sub-dataset of the "K-Nearest Neighbor" batches; (3) separate "in-spec" and "out-of-spec" batches in the sub-dataset (4) find common feature values and differences between the two group of batches, specifically those differences in signatures over the remaining batch process, for example, an average operation temperature of "in-spec" batches vs the average operation temperature of those known "out-off-spec" batches over later stages from amongst the historical data; (5) identify the top factors that show the most significant deviations from a group of "in-spec" batches and may impact batch outcome; and (6) list the top potential "root-causes" for a user to view and take corrective actions.

Figure 6:
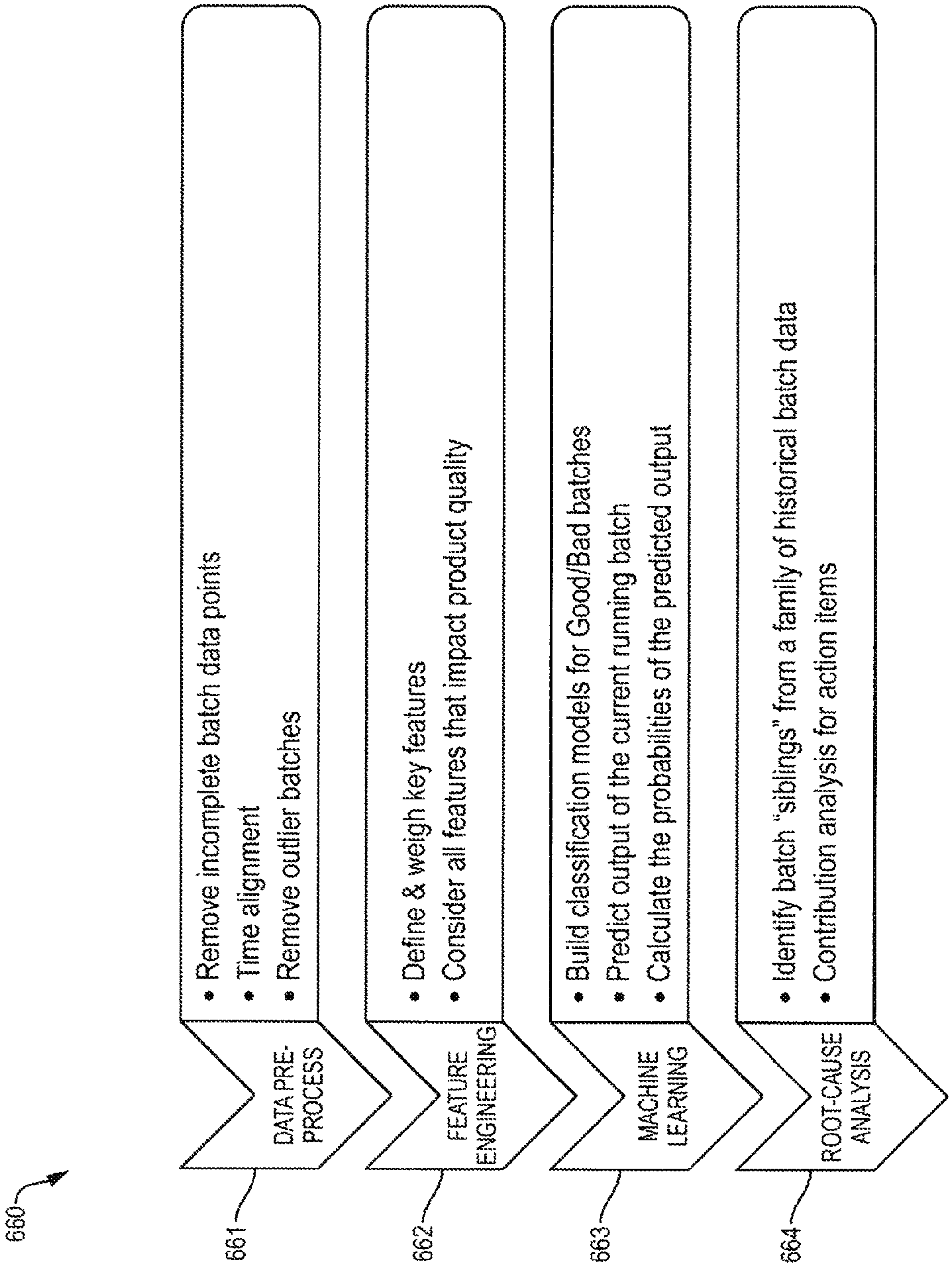
FIG. 6 is a flow diagram demonstrating an example method for building a batch signature model according to an embodiment.

FIG. 6 illustrates a workflow of a method 660 according to an embodiment. The method 660 begins at step 661 with data pre-processing. The pre-processing 661 includes removing incomplete batch data points, time aligning the batch data, and removing outlier batches. The method 660 then moves to feature engineering 662. The feature engineering 662 defines and weighs key features. These features may be any data points in the batch data that can impact batch process product quality. To continue, machine learning 663 is performed. The machine learning 663 includes building one or more classification models that are capable of predicting batch-process end-product quality. The built one or more classification models receive data of a current batch process and using that data, predict output quality of the current running batch. In an embodiment, the predicted output quality includes an indication of confidence, e.g., probability, of the predicted output quality. If the predicted output is good, e.g., the end-product is predicted to meet operational standards, no further action may be taken and the configured classifier can continue to monitor the ongoing batch process. However, if the predicted output quality is bad, e.g., the end-product is predicted to not meet operational standards, the method 660 moves to root cause analysis step 664. The root cause analysis 664 identifies batch "siblings" from a family of historical batch data. In other words, the root cause analysis 664 identifies previous batches that are similar to the current batch. From these sibling batches, a contribution analysis is performed to identify what caused the previous batches to fail, i.e., not meet end-product quality specifications. The results of this analysis can then be provided to a user or may be programmatically used by a process controller to automatically modify the ongoing batch process to attempt to improve quality of the on-going batch.

Figure 7:
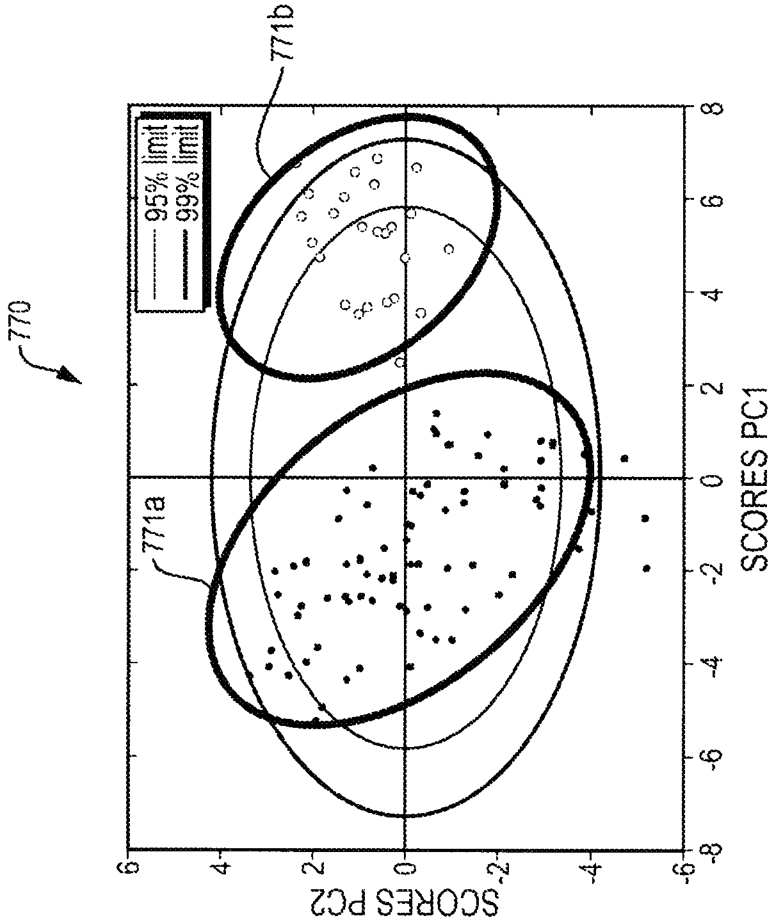
FIG. 7 is a plot of historical batch data showing different batch families with defined engineering features (EFs) in a PCA model.

FIG. 7 is a plot 770 of historical batch data showing different batch families with defined EFs in a PCA model. In this example of batch production data, batch feature values are represented by PCA scores, where each point represents a batch. Batches with similar "signatures" (e.g. features represented at score values of PC1 and PC2) form the closed groups (clusters) 771*a* and 771*b*. The shading represents batch labels, for example, the black shading (e.g., batches in cluster 771*a*) represents "in-spec" batches and the lighter shading (e.g., batches in cluster 771*b*) represents "out-of-spec" batches. An embodiment, e.g., method 550, is able to predict whether an online batch run will most likely end up in the "in-spec" cluster 771*a* or the out-of-spec cluster 771*b*. Once an online batch run is predicted most likely to be "out-of-spec", an embodiment may identify one or more out-of-spec batches, from amongst the cluster 771*b*, as "siblings" to the running batch. Such an embodiment performs an analysis on the sibling batch data, and compares the sibling batch data with a group of batches from amongst the "in-spec" batches 771*a* to identify significant differences in features between the two groups (siblings and in-spec batches). Based on these identified differences, an embodiment provides recommendations of corrective actions.

Figure 8:
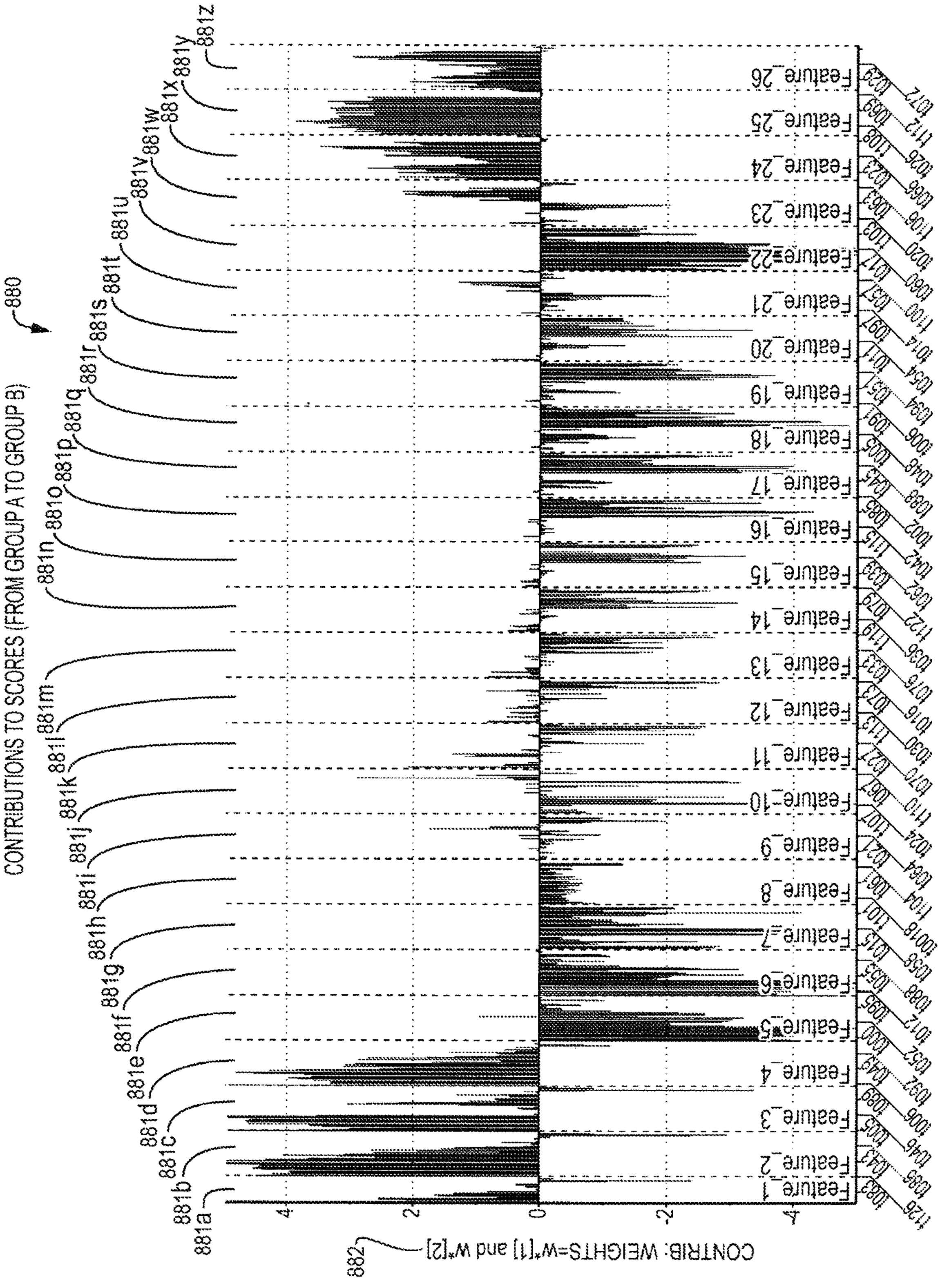
FIG. 8 is a plot of post-alert analysis results illustrating potential root-cause contribution factors based on a subset of "K-Nearest Neighbors" batches of a subject running batch versus a "Golden" batch subset.

FIG. 8 is a plot 880 of post-alert analysis results illustrating potential root-cause contribution factors based on a subset of "K-Nearest Neighbors" batches of the subject running batch versus a "golden" batch subset. In the plot 880, each column 881*a-z* pertains to contribution records of a feature/signature over time of a batch process. The bars in the columns 881*a-z* indicate the contributions up to current batch time at each pre-defined sampling point to the difference 882 between the current batch and an average golden batch, i.e. the root-causes of the deviations. To create the plot 880, for example, all features up to the current batch time are compared against a golden batch group with a PCA model and the differences in features between "siblings" group and golden batch reference group are shown in the bar chart 880. The plot 880 further illustrates an example of batch post-alert analysis indicating which factors contributed the most to the deviation/difference between the current running batch and a group of reference "golden batches".

Based on the major contributors identified by the model, prescriptive actionable advice may be provided to batch operators to allow the batch operators to make process adjustments or corrections in a timely manner. As a result, the total number of "out-of-spec" batches is reduced over time by embodiments. This provides significant economic cost-saving and the batch production success rate can be improved.

Embodiments provide comprehensive functionality to address several issues observed in existing methods, e.g. lack of earlier, quantitative predictions on the batch process end-product quality and a lack of actionable advice after and beyond a process "anomaly" alert. An embodiment is based on a supervised machine-learning technique. Such an embodiment takes historical batch data (including production results with both "in-spec" or "out-of-spec" qualities) and defines each batch as an individual entity with many measurable "features". The system pre-processes batch data and standardizes each batches' features so as to make them comparable. The batch data with known batch result labels (in-spec/out-of-spec) are split randomly as training and testing sub-datasets and the training data is fed into a selected machine learning classification model (e.g. KNN or SVM model) for training. Then, the reserved test data is used to validate the model. Once a trained and validated machine learning model is deployed online, for a given batch time point (snap-shot) for a current running batch, available data (e.g. batch initial ingredients compositions, operation strategies, continuous sensor measurements and batch phases, etc., that is currently available at that time in the batch process) is fed into the trained model and the batch process end-product quality is predicted with an accompanying probability in the prediction. In turn, a user may make operation decisions accordingly. In addition, the system and methods are able to provide detailed data analytics on the running batch based on a set of similar or closest "family siblings" batches. Action recommendations are determined based on proximity of those reference batches to the on-going batch process.

Advantages Over Existing Functionality

Embodiments offer many advantages over existing traditional batch analytic methods such as "golden batch" approaches, as well as more recent MSPC based modeling and monitoring technologies, including:

Data Usage: Existing methods, such as traditional "golden-batch" approaches or multivariate statistical MSPC techniques, usually use only data from batches that produced "in-spec" products to build "golden-batch" profiles as well as MSPC models (such as PCA and PLS models, etc.). Those batches producing "out-of-spec" products are often considered abnormal "outlier" batches and excluded. In fact, those "out-of-spec" batches contain useful information about operation mistakes and possible "root causes" that led to failed batch production. Because the existing methodologies only utilize good batch data, the built models are only good at detecting batch anomalies and issuing alerts. Detailed analytics about those anomalies and alerts are missing or limited, and the tasks of root-cause analysis and determining corrective actions are left to users (e.g. batch production operators).

In contrast, embodiments use both "in-spec" and "out-of-spec" batch data. Thus, embodiments are able to learn and predict end-product quality of a currently running batch. Based on comparisons and analytic data analyses on "out-of-spec" batch data, embodiments are able to further help plant operators to find out what are possible root-causes. For instance, if a batch process is predicted to fail, an embodiment can identify similar "out-of-spec" historical batches and from comparison between the current batch and historical batch to identify causes of the failure. Further, if a batch is predicted to fail, an embodiment can identify similar historical batches that yielded in-spec products and identify differences between the current batch, which is predicted to fail, and the historical batches that are similar, but ultimately produced desirable results. These differences can then be used to modify the current batch operation. For example, if it is determined that a previous similar batch, which was successful, operated at a temperature of 100° C. and the current batch, which is predicted to fail, is operating at 90° C., the current operating temperature of the current batch can be increased in an attempt to fix the ongoing process. In such a way, embodiments make full use of historical batch data, extract more information than prior art modeling and online monitoring methods, and provide users with improved batch product quality predictions.

Batch data alignment, unfolding, feature engineering and signature match: In existing methods, either traditional "golden batch" profiles or statistical MSPC models are built based on batch historical data with pure statistical methods. Several disadvantages have been observed and reported in industrial applications. One of the most frequent problems are false alerts due to overly-tight thresholds generated from pure statistics-based methods. Another problem is a lack of supporting root-cause-analysis after an alert is issued. These problems are challenging to batch production operators, but it is difficult to solve those problems with prior art methods due to their limited capability.

In contrast, embodiments provide batch production operators with leveraged capability, that enables operators to obtain not only alerts, but also quantitative supporting reports about what is going on during the batch process and what is different from a normal batch. All detailed data analytics provided by embodiments are generated using a synergistic combination of a set of innovative techniques including batch data alignment, unfolding, feature engineering, signature match, and k-nearest batch analysis.

Capability of prediction: Current best practice methods, at best, provide anomaly detection through comparisons between current batch data, which may include batch initial ingredients and measured controlled variable trajectories, and average values and trajectories of all "in-spec" batches (e.g., a "golden batch" profile or a multivariate MSPC version of scores in latent space). Once the current running batch data is outside the boundary of a specified space, such as out of an envelope of a "golden batch" profile, or beyond a statistical confidence limit, for example squared prediction error (SPE) threshold in a MSPC case, existing methods can only issue alerts. The existing methods have no capability to predict the results of this alert (anomaly) and no actionable advice is provided.

On the other hand, embodiments are able to predict the outcome of a running batch, i.e. what is the probability the current batch will produce "in-spec" products and what is the probability the current batch will produce "out-of-spec" products. For batch monitoring, a prediction of an "in-spec" batch with high probability will gain great confidence for batch operators. Such a prediction indicates that currently the process is operating normally and the current batch is going to be a successful batch. When embodiments predict the current batch run is going to produce "out-of-spec" products with high probability, embodiments can perform a detailed follow-up analysis to assist batch operators with finding possible "root-causes" and provide recommended actionable advice. In such a way, embodiments enable batch operators to take actions early and correct subsequent batch operations in a timely manner to reduce the rate of "out-of-spec" products.

Accurate "local" model: In existing methods, for example, "golden-batch" approaches and MSPC monitoring, models are built on a "center" of historical "in-spec" batches, typically around a statistical mean or median and bounded with a "golden-batch" profile envelope or statistical 95% or 99% confidence limits. However, oftentimes, industrial batch data does not perfectly follow an assumed Gaussian distribution. For example, batch data is frequently observed to follow multiple Gaussian distributions or be clustered. For such a case, any model built by existing methods is inaccurate and often a trade-off is made between model complexity and accuracy.

Embodiments address this problem (so called the "nearest neighbor" ML technique, i.e. built data analytics with those "nearest neighbors" batch data around the current running batch) by instead using all or average of a large amount of batch data. As a result, an accurate "local model" is built and used for more relevant analysis with higher accuracy than existing methods.

Root-cause-analysis for more "actionable" advice to reduce "out-of-spec" batches: Existing batch monitoring systems provide alerts when one or more process anomalies are detected. Any root-cause analyses performed in response to these anomaly alerts rely on user domain knowledge and manual operations. Unlike these existing methods, embodiments automatically select data and perform root-cause-analysis. Embodiments allow users to conduct a quick root-cause-analysis for a running batch and find out those potential factors based a comparison between nearest-neighbors batches to the current batch run (the batch run being analyzed) and a normal "in-spec" batch. Based on a root-cause-analysis, actionable items are recommended by embodiments. These actionable items can be automatically implemented and/or operators may make some corrections/changes to operation of the current batch production based on the actionable items. As a result, out-of-spec batches can be significantly reduced.

Computer Support

Figure 9:
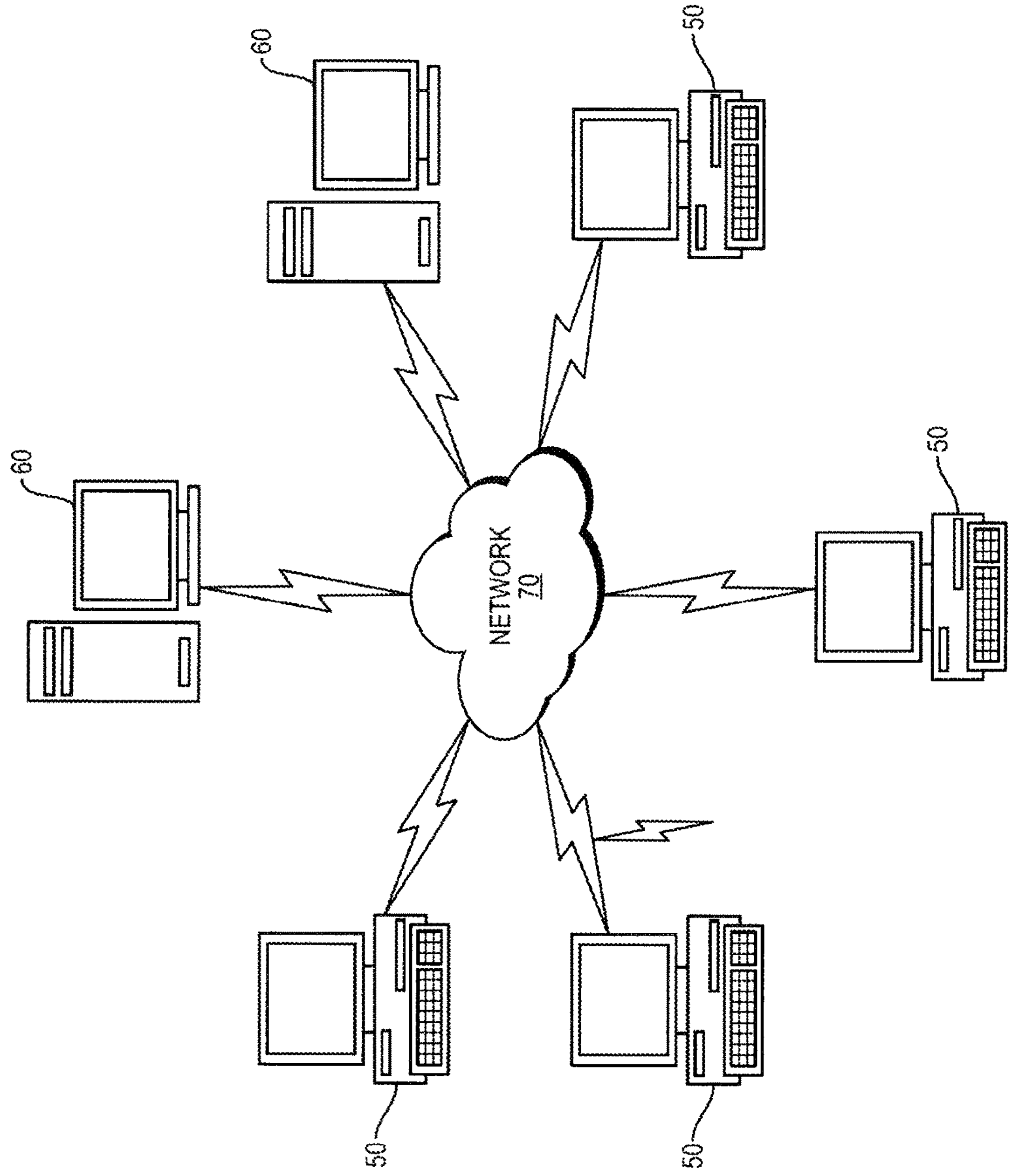
FIG. 9 is a schematic view of a computer network environment in which embodiments may be deployed.

FIG. 9 illustrates a computer network or similar digital processing environment in which embodiments of the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), cloud computing servers or service, a worldwide collection of computers, Local area or Wide area networks, and gateways that currently use respective protocols (TCP/IP, Bluetooth, etc.) to communicate with one another. Other electronic device/computer network architectures are suitable.

Figure 10:
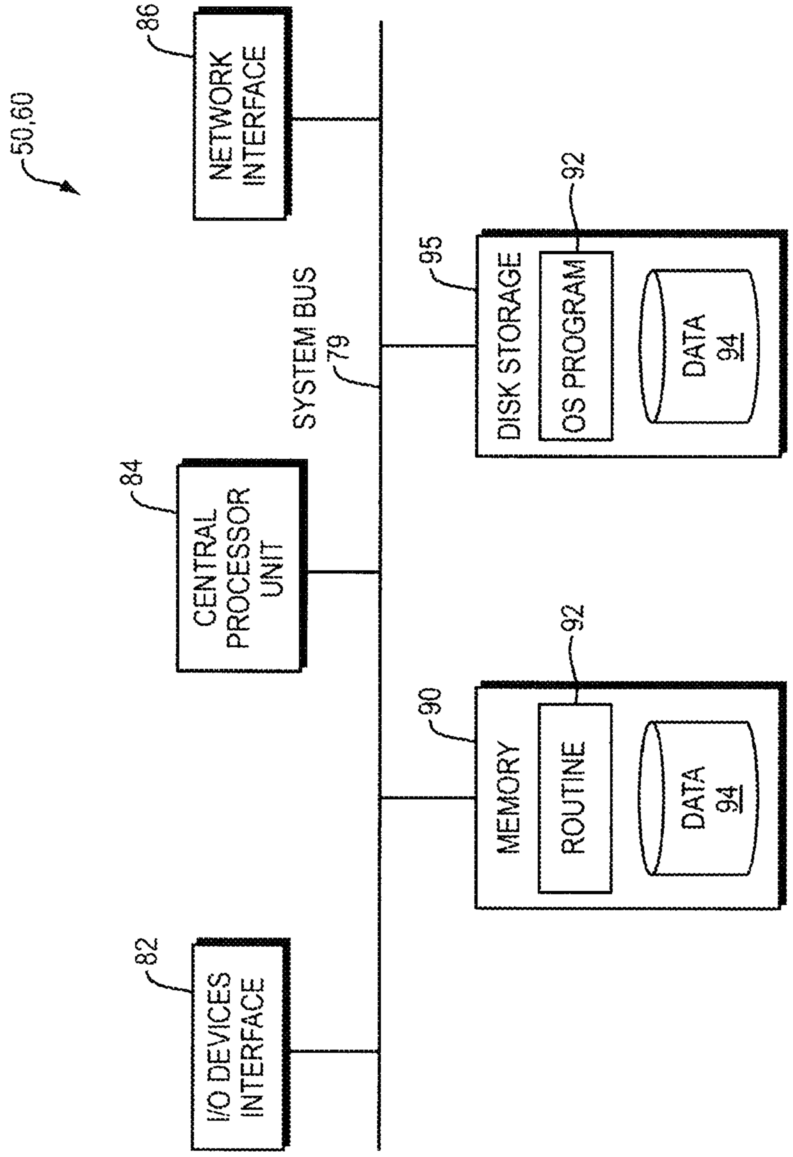
FIG. 10 is a block diagram of a computer (or digital processing) node in the network of FIG. 9.

FIG. 10 is a diagram of the internal structure of a computer (e.g., client processor/device 50 or server computers 60) in the computer system of FIG. 9. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 9). Memory 90 provides volatile storage for computer software instructions 92 and data 94 used to implement an embodiment of the present invention (e.g., the method 220 of FIG. 2, the method 550 of FIGS. 5A-5D, and the method 660 of FIG. 6 detailed above). Disk storage 95 provides non-volatile storage for computer software instructions 92 and data 94 used to implement an embodiment of the present invention. The memory 90 and disk storage 95 can be configured to store the batch data and predictive models described herein. Moreover, the memory 90 and disk storage 95 can be configured to implement the various systems and methods described herein. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

In other embodiments, the program product 92 may be implemented as a so called Software as a Service (SaaS), or other installation or communication supporting end-users.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A computer-implemented method for creating a machine learning predictive model for real-world batch production industrial process monitoring and optimization, the method comprising:

obtaining historical operating data from a plurality of batch production runs of an industrial process;

standardizing the obtained historical operating data for each run of the plurality of batch production runs;

for each batch production run of the plurality: (i) partitioning standardized operating data corresponding to the batch production run into one or more stages and (ii) determining one or more signature for each of the one or more stages using the partitioned standardized operating data corresponding to the one or more stages;

associating each determined signature with a class label based upon output of a batch production run of the plurality corresponding to the determined signature conforming with operational standards or not conforming with the operational standards;

training a machine learning predictive pattern model with at least a subset of the determined signatures as inputs and associated class labels as outputs, wherein the training configures the model to predict, based on operating data from a real-world batch production process, whether output of the real-world batch production process will conform or not conform with the operational standards;

wherein the obtaining, standardizing, partitioning, determining, associating, and training are automatically implemented by one or more processors;

automatically receiving sensor data from an ongoing batch production run of the industrial process;

processing the received sensor data with the trained machine learning predictive pattern model to determine a prediction of output of the ongoing batch production run as conforming or non-conforming with the operational standards;

wherein the determined prediction includes an indication of statistical probability in the determined prediction;

at a current batch progress stage of the ongoing batch production run, examining the indication of statistical probability in the determined prediction; and performing an online root-cause analysis if: (i) the determined prediction indicates the output is non-conforming and (ii) the indication of statistical probability in the determined prediction is above a threshold.

2. The method of claim 1 wherein, for each batch production run of the plurality, the obtained historical operating data is configured to include: (i) batch initialization data, (ii) batch progress data, and (iii) batch end product quality data.

3. The method of claim 1 wherein standardizing the obtained historical operating data for each run of the plurality comprises at least one of:

aligning the obtained historical operating data for each batch production run of the plurality with a specified standard reference batch over time;

detecting and removing outlier runs from the obtained historical operating data; and labeling each batch production run of the plurality with a class label, wherein each class label indicates whether output of the batch production run conforms with the operational standards or is not conforming with the operational standards.

4. The method of claim 1 wherein determining one or more signature for each of the one or more stages using the partitioned standardized operating data comprises:

generating one or more engineering features (EFs) or Key Performance Indicators (KPIs), using the partitioned standardized operating data corresponding to the one or more stages; and grouping the generated one or more EFs or KPIs into a set to form a given signature.

5. The method of claim 4 wherein the set is an expandable set and grouping the generated one or more EFs or KPIs into the expandable set to form the given signature comprises:

(i) adding the one or more EFs or KPIs into the expandable set over time as the one or more EFs or KPIs are generated; and (ii) assigning a weight to each of the generated one or more EFs or KPIs in the expandable set.

6. The method of claim 5 wherein the expandable set increases in size over the time with progress of a given batch production run.

7. The method of claim 1 further comprising:

receiving input indicating a selected signature type; and wherein, in determining a given signature, the selected signature type is determined.

8. The method of claim 1 wherein each signature is determined at pre-defined points of each stage.

9. The method of claim 1 wherein the obtained historical operating data is collected from one or more sensor measurements.

10. The method of claim 1 wherein training the machine learning predictive pattern model with at least a subset of the determined signatures as inputs and associated class labels as outputs comprises at least one of:

(i) splitting the determined signatures into a training sub-dataset and a testing sub-dataset, wherein the training sub-dataset is the subset of the determined signatures;

(ii) training the machine learning predictive pattern model with a K-Nearest Neighbor (KNN) and Support Vector Machine (SVM) supervised-learning methodology by feeding determined signatures from the training sub-dataset into the at least one machine learning predictive pattern model as inputs and associated class labels as outputs;

(iii) validating the trained machine learning predictive pattern model with the testing sub-dataset; and (iv) fine-tuning KNN and SVM model parameters.

11. The method of claim 1 further comprising:

issuing an alert to a user if both (i) the determined prediction indicates the output is non-conforming and (ii) the indication of statistical probability in the determined prediction is above a given threshold.

12. The method of claim 1 wherein (i) the determined prediction indicates the output is non-conforming and (ii) the indication of statistical probability in the determined prediction is above a given threshold, and the method further comprises:

from among the historical operating data, determining at least one K-nearest neighbor batch to the ongoing batch production run; and based on the determined at least one K-nearest neighbor batch, performing a comparative analysis between the at least one K-nearest neighbor batch and a standard reference batch by using at least one multivariate statistical model.

13. The method of claim 1 further comprising:

deploying the trained machine learning predictive pattern model online in the industrial process at one or more pre-specified time points of a batch run;

using the deployed trained machine learning predictive pattern model, predicting whether output of the batch run of the industrial process will conform or not conform with the operational standards; and executing real-time batch monitoring and analysis based on the predicting, wherein the analysis includes (i) diagnosing one or more operational problems in the batch run of the industrial process and (ii) providing prescriptive guidance to a plant operator with one or more recommended corrective actions.

14. The method of claim 13 wherein diagnosing one or more operational problems and providing prescriptive guidance to a plant operator further comprises:

identifying one or more contributing KPIs; and outputting an alert to the plant operator with an associated risk assessment report and a root-cause analysis report.

15. The method of claim 1 wherein the operational standard is at least one of: a physical criterion and a chemical criterion.

16. A computer system for creating a machine learning predictive model for real-world batch production industrial process monitoring and optimization, the system comprising:

a processor; and a memory with computer code instructions stored thereon, the processor and the memory, with the computer code instructions, being configured to cause the system to:

obtain historical operating data from a plurality of batch production runs of an industrial process;

standardize the obtained historical operating data for each run of the plurality of batch production runs;

for each batch production run of the plurality: (i) partition standardized operating data corresponding to the batch production run into one or more stages and (ii) determine one or more signature for each of the one or more stages using the partitioned standardized operating data corresponding to the one or more stages;

associate each determined signature with a class label based upon output of a batch production run of the plurality corresponding to the determined signature conforming with operational standards or not conforming with the operational standards;

train a machine learning predictive pattern model with at least a subset of the determined signatures as inputs and associated class labels as outputs, wherein the training configures the model to predict, based on operating data from a real-world batch production process, whether output of the real-world batch production process will conform or not conform with the operational standards;

automatically receive sensor data from an ongoing batch production run of the industrial process;

process the received sensor data with the trained machine learning predictive pattern model to determine a prediction of output of the ongoing batch production run as conforming or non-conforming with the operational standards;

wherein the determined prediction includes an indication of statistical probability in the determined prediction;

at a current batch progress stage of the ongoing batch production run, examine the indication of statistical probability in the determined prediction; and perform an online root-cause analysis if: (i) the determined prediction indicates the output is non-conforming and (ii) the indication of statistical probability in the determined prediction is above a threshold.

17. A computer program product for creating a machine learning predictive model for real-world batch production industrial process monitoring and optimization, the computer program product comprising:

one or more non-transitory computer-readable storage devices and program instructions stored on at least one of the one or more storage devices, the program instructions, when loaded and executed by a processor, cause an apparatus associated with the processor to:

obtain historical operating data from a plurality of batch production runs of an industrial process;

standardize the obtained historical operating data for each run of the plurality of batch production runs;

for each batch production run of the plurality: (i) partition standardized operating data corresponding to the batch production run into one or more stages and (ii) determine one or more signature for each of the one or more stages using the partitioned standardized operating data corresponding to the one or more stages;

associate each determined signature with a class label based upon output of a batch production run of the plurality corresponding to the determined signature conforming with operational standards or not conforming with the operational standards;

train a machine learning predictive pattern model with at least a subset of the determined signatures as inputs and associated class labels as outputs, wherein the training configures the model to predict, based on operating data from a real-world batch production process, whether output of the real-world batch production process will conform or not conform with the operational standards;

automatically receive sensor data from an ongoing batch production run of the industrial process;

process the received sensor data with the trained machine learning predictive pattern model to determine a prediction of output of the ongoing batch production run as conforming or non-conforming with the operational standards;

wherein the determined prediction includes an indication of statistical probability in the determined prediction;

at a current batch progress stage of the ongoing batch production run, examine the indication of statistical probability in the determined prediction; and perform an online root-cause analysis if: (i) the determined prediction indicates the output is non-conforming and (ii) the indication of statistical probability in the determined prediction is above a threshold.

* * * * *